United States Patent
Chou et al.

(10) Patent No.: US 10,192,353 B1
(45) Date of Patent: Jan. 29, 2019

(54) MULTIRESOLUTION SURFACE REPRESENTATION AND COMPRESSION

(71) Applicant: 8i Limited, Te Aro (NZ)

(72) Inventors: Philip A. Chou, Culver City, CA (US);
Maja Krivokuca, Wllington (NZ);
Robert James William Higgs,
Wellington (NZ); Charles Loop, Culver City, CA (US); Eugene Joseph d'Eon, Wellington (NZ)

(73) Assignee: 8i Limited, Wellington (NZ)

( * ) Notice: Subject to any disclaimer, the term of this patent is extended or adjusted under 35 U.S.C. 154(b) by 0 days.

(21) Appl. No.: 15/786,277

(22) Filed: Oct. 17, 2017

Related U.S. Application Data

(60) Provisional application No. 62/570,523, filed on Oct. 10, 2017.

(51) Int. Cl.
*G06T 17/20* (2006.01)
*G06T 17/00* (2006.01)
*G06T 15/50* (2011.01)
*G06T 15/10* (2011.01)

(52) U.S. Cl.
CPC ............ *G06T 17/005* (2013.01); *G06T 15/10* (2013.01); *G06T 15/50* (2013.01); *G06T 17/20* (2013.01)

(58) Field of Classification Search
USPC ................................................ 345/420, 424
See application file for complete search history.

(56) References Cited

U.S. PATENT DOCUMENTS

| | | | | |
|---|---|---|---|---|
| 6,476,805 B1* | 11/2002 | Shum | .......................... | G06T 7/97 345/420 |
| 9,171,396 B2* | 10/2015 | Jenkins | .................... | G06T 15/40 |
| 9,489,762 B2* | 11/2016 | Jenkins | .................... | G06T 15/20 |
| 9,536,022 B1* | 1/2017 | Tertois | .................. | G01V 99/005 |
| 2004/0021662 A1* | 2/2004 | Taubin | ....................... | G06T 9/00 345/419 |
| 2005/0131660 A1* | 6/2005 | Yadegar | .................. | G06T 9/001 703/2 |
| 2006/0235666 A1* | 10/2006 | Assa | ....................... | G01V 11/00 703/10 |
| 2006/0290695 A1* | 12/2006 | Salomie | .................. | G06T 17/20 345/420 |

(Continued)

OTHER PUBLICATIONS

Alliez, P., et al., "Recent Advances in Compression of 3D Meshes", Advances in Multiresolution for Geometric Modelling, Springer, (2003), 3-26.

(Continued)

*Primary Examiner* — Kimbinh T Nguyen
(74) *Attorney, Agent, or Firm* — Schwegman Lundberg & Woessner, P.A.

(57) ABSTRACT

A machine can be specially configured to generate, compress, decompress, store, access, communicate, or otherwise process a special data structure that represents a three-dimensional surface of an object. The data structure can be or include a pruned sparse voxel octree in which each node in the octree corresponds to a different block of the octree, and children of the node in the octree correspond to the smaller blocks that subdivide the block. Moreover, each block occupied by the surface or a portion thereof can define its enclosed surface or portion thereof explicitly or implicitly.

21 Claims, 23 Drawing Sheets

(56) References Cited

U.S. PATENT DOCUMENTS

| | | | | |
|---|---|---|---|---|
| 2009/0167763 | A1* | 7/2009 | Waechter | G06T 15/06 345/426 |
| 2009/0244065 | A1* | 10/2009 | Storti | G06K 9/342 345/420 |
| 2012/0256915 | A1* | 10/2012 | Jenkins | G06T 15/40 345/419 |

OTHER PUBLICATIONS

Chou, Philip A., et al., "Optimal pruning with applications to tree-structured source coding and modeling", IEEE Transactions on Information Theory, vol. 35, No. 2, (Mar. 1989), pp. 299-315.

Loop, C, et al., "A closed-form Bayesian fusion equation using occupancy probablilities", Proc. Fourth Int'l Conf. on 3D Vision (3DV'16). IEEE, Oct. 2016., (Oct. 2016), 380-388.

Maglo, A, et al., "3D mesh compression: survey, comparisons and emerging trends", ACM Computing Surveys, vol. 9, No. 4, (Sep. 2013), 40 pgs.

Peng, J, et al., "Technologies for 3D mesh compression—A survey", J. Vis. Commun. Image R. 16, (2005), 688-733.

Sullivan, Gary, et al., "Overview of the High Ef?ciency Video Coding (HEVC) Standard", EEE Transactions on Circuits and Systems for Video Technology, vol. 22, No. 12., (Dec. 2012), 1649-1668.

Wu, X, et al., "Wavelet coding of volumetric medical images for high throughput and operability", IEEE Trans. Medical Imaging, vol. 24, No. 6, (Jun. 2005), 719-727.

* cited by examiner

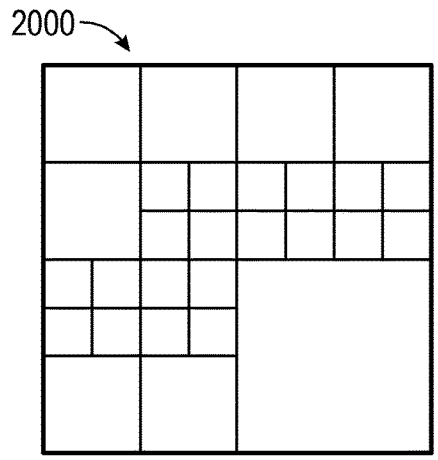
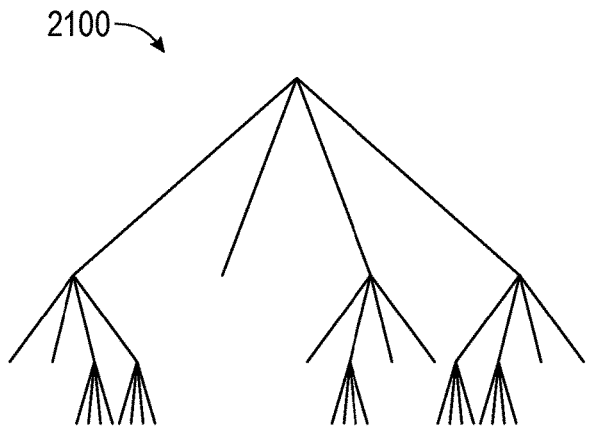
FIG. 20  FIG. 21
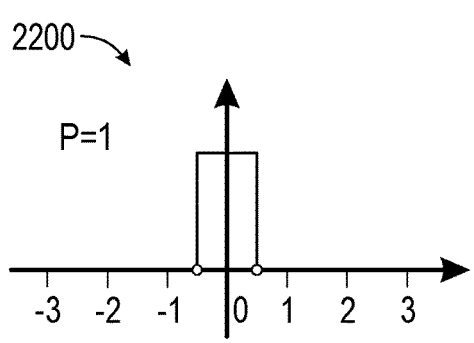
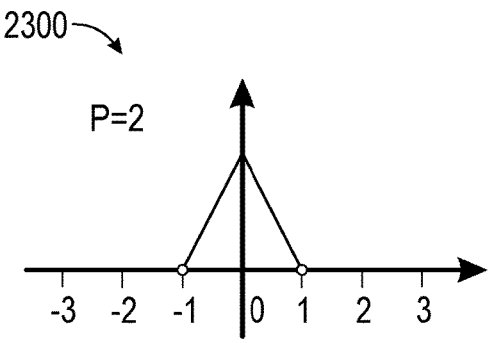
FIG. 22  FIG. 23
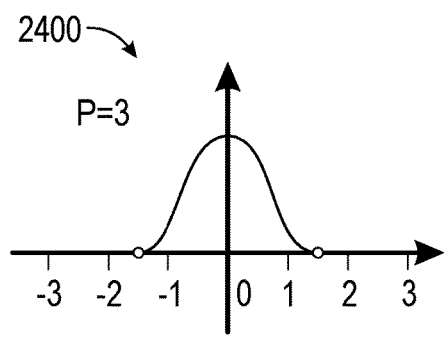
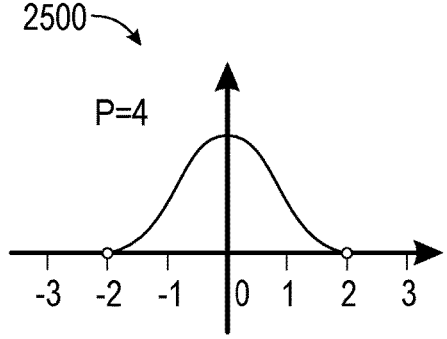
FIG. 24  FIG. 25

MULTIRESOLUTION SURFACE REPRESENTATION AND COMPRESSION

PRIORITY CLAIM

This application claims the benefit of priority to U.S. Provisional Patent Application Ser. No. 62/570,523, filed on Oct. 17, 2017, the benefit of priority of each of which is claimed hereby, and each of which is incorporated by reference herein in its entirety.

TECHNICAL FIELD

The subject matter disclosed herein generally relates to the technical field of special-purpose machines that facilitate computer graphics, including software-configured computerized variants of such special-purpose machines and improvements to such variants, and to the technologies by which such special-purpose machines become improved compared to other special-purpose machines that facilitate computer graphics. Specifically, the present disclosure addresses systems and methods to facilitate multiresolution surface representation and compression.

BACKGROUND

A machine can be configured to generate, compress, decompress, store, communicate, or otherwise process computer graphics that represent two-dimensional (2D) or three-dimensional (3D) objects. As one example, the machine may generate, compress, decompress, or otherwise process a mesh that represents the 3D surfaces of a 3D object as a set of connected polygons (e.g., triangles), which are in turn represented by lists of vertices and connections among such vertices. The 3D positions of the vertices are known as geometry, and the connections among them are known as connectivity.

To compress a mesh, both geometry information and connectivity information are compressed. Time-varying surfaces are known as dynamic or animated meshes. For dynamic meshes, the geometry information also includes the motion information. For meshes, spatial random access is generally achieved by breaking a mesh into regions and compressing each one separately. Breaking a mesh into regions also allows the mesh to be processed in parallel or out-of-core. Progressive mesh compression is generally achieved by starting with a coarse mesh and either subdividing the faces or splitting the vertices, resulting in a sequence of increasingly fine meshes. In some scenarios, the finest mesh output from a decoder is constrained to have connectivity identical to the mesh that was input to an encoder; in other scenarios, it is acceptable to "remesh" the input mesh.

As another example, the machine may generate, compress, decompress, or otherwise process voxels that represent the 3D surfaces of the 3D object. Voxels are particularly popular in the robotics community. A voxel is said to be occupied if a scanner (e.g., a light detection and ranging (LIDAR) scanner) determines that the voxel has a surface passing through it. Thus, a set of occupied voxels can be considered a representation of a surface. Such a set of occupied voxels is sparse in 3D, because the voxels lie only on a surface. In robotics, the occupied voxels are said to lie on an occupancy grid.

A Sparse Voxel Octree (SVO) is a data structure (e.g., an octree) that represents a sparse set of occupied voxels. In an SVO, the root node is identified with a cube in space. If the cube is occupied (i.e., if it contains an occupied voxel), then the cube is subdivided into eight sub-cubes. Each sub-cube may, in turn, be occupied or not. Those sub-cubes that are occupied are identified with an 8-bit byte, or occupancy code, for the root node. Occupied sub-cubes are recursively sub-divided until their corresponding nodes in the octree reach a certain level or depth of the octree.

As a further example, the machine may generate, compress, decompress, or otherwise process a function that represents a 3D surface implicitly. Suppose $f(x)$ is a real scalar function of $x \in \mathbb{R}^3$, and suppose c is a real constant. Then the set of all x such that $f(x)=c$ implicitly defines a surface. Thus any representation of $f(x)$ is a representation of the surface. One option for $f(x)$ is the distance function, $$f(x) = \min_{y \in S} \|x - y\|,$$

which equals 0 if and only if $x \in S$, where S is the surface. Thus $f(x)=0$ defines the surface S.

Another option for $f(x)$ is the signed distance function, which can be defined as follows. With S as the surface, let $$\min_{y \in S} \|x - y\|$$

be the distance between x and S, let $$y_x = \operatorname{argmin}_{y \in S} \|x - y\|$$

be the closest point to x on S, let $n(y_x)$ be the surface normal at $y_x$, and let $\operatorname{sgn}((y_x - x) \cdot n(y_x))$ be the sign of the dot product between $y_x - x$ and $n(y_x)$, which is typically negative outside the surface and positive inside the surface. Then the signed-distance function is $$f(x) = \operatorname{sgn}((y_x - x) \cdot n(y_x)) \min_{y \in S} \|x - y\|,$$

and $f(x)=0$ defines the surface S. Another option for $f(x)$ is the occupancy probability, that is, the probability that the point x lies on or inside the surface of an object. In this case, $f(x)=½$ may be used to define the surface S.

BRIEF DESCRIPTION OF THE DRAWINGS

Some embodiments are illustrated by way of example and not limitation in the figures of the accompanying drawings.

FIG. 20 is a conceptual diagram illustrating a 2D example of a multiresolution representation of a blockable surface.

FIG. 21 is a conceptual diagram illustrating the corresponding octree for the 2D example of the multiresolution representation of the blockable surface.

FIG. 22 is a conceptual diagram illustrating $B^{(p)}(x)$ for $p=1$.

FIG. 23 is a conceptual diagram illustrating $B^{(p)}(x)$ for $p=2$.

FIG. 24 is a conceptual diagram illustrating $B^{(p)}(x)$ for $p=3$.

FIG. 25 is a conceptual diagram illustrating $B^{(p)}(x)$ for $p=4$.

DETAILED DESCRIPTION

Figure 1:
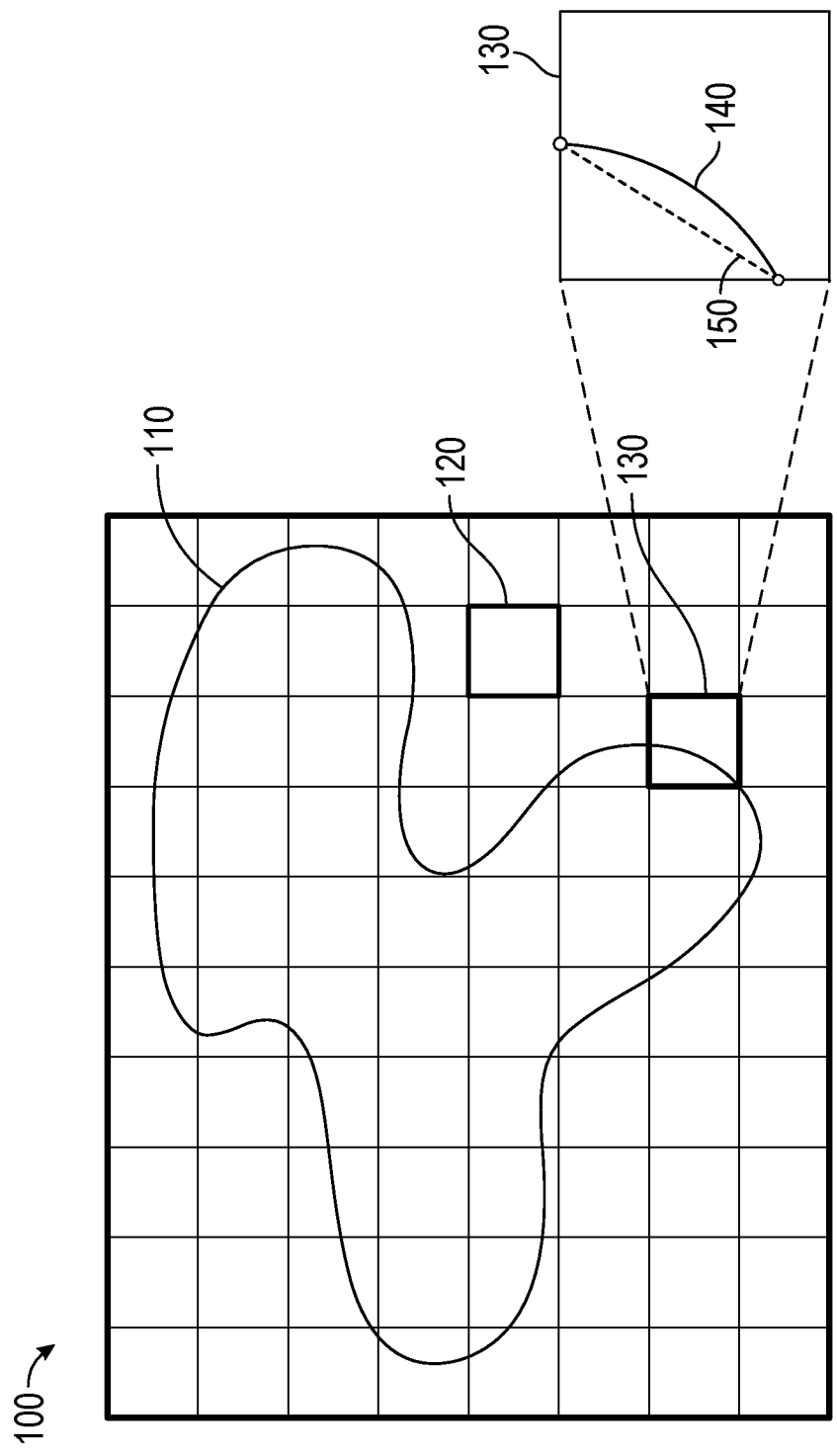
FIG. 1 is a conceptual diagram illustrating a blockable representation of a 2D surface.

Example methods (e.g., algorithms) facilitate multiresolution surface representation and compression, and example systems (e.g., special-purpose machines configured by special-purpose software) are configured to facilitate multiresolution surface representation and compression. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a computer system) can be configured to perform multiresolution representation of a surface (e.g., 2D or 3D) and related computer graphics tasks, including compression, decompression, storage, indexing, or other processing of the multiresolution representation of the surface. Such a machine may be specially configured by software (e.g., one or more modules, applications, apps, or other executable code), hardware (e.g., one or more processors), or any suitable combination thereof, in accordance with the methodologies and systems described herein, which methods and systems provide the benefit of implementing surface representations that respect block boundaries and are highly compressible.

For virtual reality, augmented reality, and related contexts in which time-varying 3D objects are stored communicated, or both, it can be helpful to have compact representations of the surfaces of the objects. That is, the surface representations should be compressible into small numbers of bits. In addition, it can be beneficial to be able to represent surfaces with arbitrary topology and arbitrary scale. It can also be beneficial for the representation to provide random spatial access to different parts of the surface at different scales (e.g., different parts of an object, different objects in a room, different rooms in a building, different buildings in a city, etc.), as well as to provide random temporal access to different moments in time. It can additionally be beneficial to be able to provide increasing degrees of spatial, temporal, and signal resolution by decoding increasing numbers of bits (e.g., with scalable or progressive coding). It can further be beneficial to provide for efficient and parallel computation, as well as out-of-core computation of large datasets.

The systems and methods described herein provide such benefits (e.g., as solutions to corresponding problems) by implementing a block-oriented representation for a surface. Having a surface representation that can be easily partitioned into blocks reduces computational complexity, in a way that can be thought of analogously to image and video processing. In image and video processing, all the representations of individual images or video frames are block-oriented, due to the highly regular organization of the source signal (e.g., images or video). For image and video compression, there are many techniques for low bitrate compression, random spatial and temporal access, scalable or progressive coding, and parallel computation. For example, random spatial access may be provided by tiles, random temporal access may be provided by B-frames, scalable or progressive coding may be provided by wavelets or bitplane coding, and parallel computation may be provided by slices. Many of the techniques used for compression of video (also known as 2D+T or two-dimensions plus time) can be generalized to 3D for contexts such as volumetric medical imaging (e.g., computer tomography scans), possibly as a function of time. Just as 2D image or video compression assumes a dense 2D grid of pixels, 3D volumetric image compression assumes a dense 3D grid of voxels.

For contexts involving time-varying 3D objects (e.g., virtual reality, augmented reality, and related contexts), only the surface of an object is relevant. The surface can be considered a 2D manifold embedded in 3D. As a set in 3D, the 2D manifold is sparse. Thus the 3D volumetric techniques that are applicable to dense 3D sets of voxels in a grid do not directly apply to time-varying 2D manifolds embedded in 3D. Accordingly, 2D (e.g., image) or 2D+T (e.g., video) processing techniques do not directly apply to time-varying 2D manifolds embedded in 3D; due to the irregular nature of the manifold, the manifold is not directly representable as a 2D grid of pixels.

According to the systems and methods discussed herein, a surface is represented by (1) a pruned SVO whose leaves may lie at varying depths, plus (2) a representation of the surface within each leaf of the SVO. Thus, the surface is represented by a special data structure (e.g., in memory, in a buffer, or in a database) that includes the pruned SVO and also includes the representations that correspond to the leaves of the pruned SVO. Such a special data structure may be considered as a multiresolution data structure in the sense that the data structure defines or otherwise represents the surface at multiple resolutions.

A machine specially configured in accordance with the systems and methods discussed herein implements one or both of two specific ways to represent a surface within each leaf. In the first way, the surface is represented explicitly as a polygon whose vertices lie at specified locations along specified edges of the leaf block. In the second way, the surface is represented implicitly as the set of points satisfying a function $f(x)=c$ where $f(x)$ is defined across the leaf and interpolates the values of $f(x)$ defined on the corners of the leaf block.

In the first case, compression of the data structure that represents the surface is achieved by quantizing and entropy coding the edge locations, while in the second case, compression of the data structure that represents the surface is achieved by quantizing and entropy coding the values of $f(x)$ on the corners of each leaf volume. Motion of the surface is represented by a trajectory, over time, of the position of each vertex (in the first case) or the position of each corner (in the second case). Trajectories are blocked into Groups of Frames (GOFs), which provide temporal random access. Scalable or progressive coding is achieved by using the multi-resolution nature of the octree. By pruning the octree in a nested sequence, surfaces can be obtained at a nested set of spatial resolutions. Scalable temporal resolution can be obtained using approaches similar to video (e.g., B-frames). Spatial random access can be done by collecting blocks and all their boundary values. Temporal random access can be done on a GOF basis, as for video coding. Parallel and out-of-core computation can be performed by processing blocks in groups.

As used herein, a "surface" is a set of points in $\mathbb{R}^3$, and a "representation" or "model" of one surface is a family of other surfaces specifiable by a set of parameters. When the family is understood from context, the word "representation" or "model" refers to particular values of the parameters, or to a particular surface in the family, rather than to the entirety of the family itself. Also, in some contexts, it can be said that an arbitrary surface can be represented, modeled, or approximated by a surface in the family. Furthermore, as used herein, a representation of the surface is "blockable" if there exists a partition of 3D space into rectangular cuboids, called blocks, for which the entire surface within a block can be represented by the boundary conditions of the block. A boundary condition of a block is a set of parameters whose values are defined on the boundaries of the block.

FIG. 1 illustrates an example of a blockable surface representation of a 2D surface 110, which is bounded by a region 100. A block 120 in the region 100 is not occupied. A block 130 in the region 100 is occupied if the surface 110 intersects the block 130, that is to say, if some portion of the surface 110 lies within the block 130. According to the systems and methods discussed herein, a complete model of the surface 110 is given by a description of which blocks (e.g., block 130, but not block 120) are occupied and the boundary conditions of all the blocks. Random spatial access is possible by specifying a subset of the blocks and the boundary conditions on those blocks. Since boundary conditions are shared by neighboring blocks, the representation can guarantee continuity properties across block boundaries, as will be illustrated below. There are at least two example ways in which the surface 110 or a portion 140 thereof within a block can be represented solely by boundary conditions of the block. In FIG. 1, such a representation 150 can be or include a model or approximation of the portion 130 of the surface 110 within the block 130.

A first example is an explicit representation of the surface or portion thereof within a block (e.g., block 130). Such a representation may be called a TriSoup, for reasons that will become apparent shortly. In this explicit representation, the surface 110 or portion 140 thereof that lies within the block is modeled by a polygon with n vertices, for $n \in \{3, \ldots, 12\}$. Each vertex lies on an edge of the block, and each edge contains at most one vertex. Since there are 12 edges of a block, the polygon modeling the surface or portion thereof can have at most 12 vertices.

Figure 2:
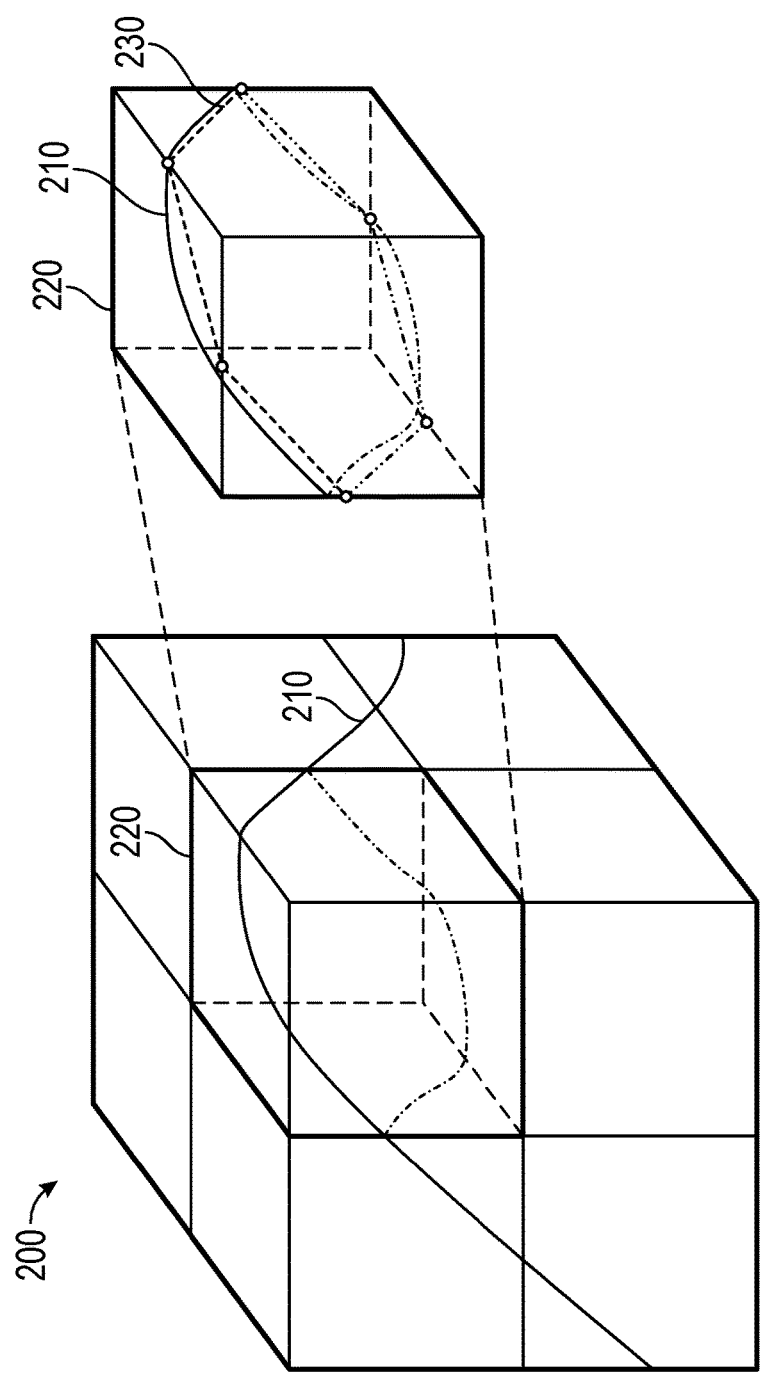
FIG. 2 is a conceptual diagram illustrating a blockable representation of a 3D surface.

FIG. 2 illustrates a blockable representation of a 3D surface 210, as well as an example of a block 220 in a TriSoup. The surface 210 intersects the block 220, which is therefore an occupied block, and the block 220 exists among multiple blocks 200 in 3D space. Within the block 220, the enclosed portion of the surface 210 intersects the edges the block at six illustrated vertices of a polygon 230. An edge of the block 200 is said to be selected if it contains a vertex.

Figure 2A:
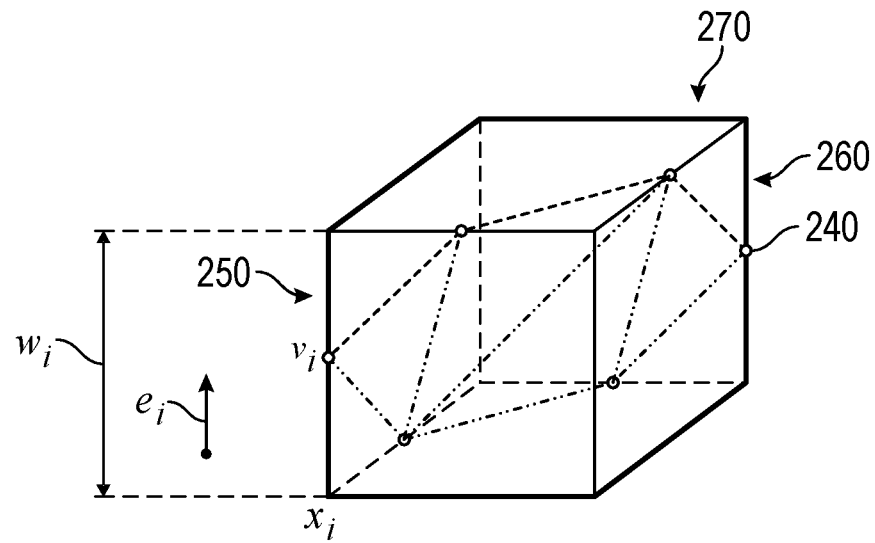
FIG. 2A is a conceptual diagram illustrating a block in a TriSoup.

FIG. 2A illustrates the block 220 in the TriSoup, omitting the surface 210 for clarity, and showing a non-selected edge 270, a selected edge 260, and the ith edge 250. Suppose the ith edge 250 is selected. The ith edge 250 is a line segment described by a set of points $x = x_i + \alpha_i W_i e_i$, for $\alpha_i \in [0,1]$, where $x_i$ is the beginning of the segment, $e_i$ is a unit vector in the direction of the segment, and $W_i$ is the length of the segment. To specify a vertex $v_i = x_i + \alpha_i W_i e_i$ on edge i, one specifies a scalar value $\alpha_i$ to indicate a corresponding fraction of the length of the edge 250. One possibility is to choose $\alpha_i$ such that $v_i$ is the location along the edge 250 where the edge 250 intersects the surface 210.

Figure 3:
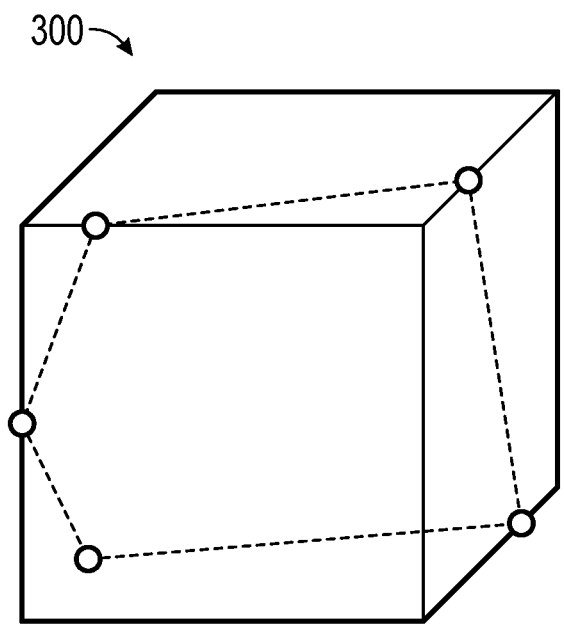
FIGS. 3-5 are conceptual diagrams illustrating determination of triangulation in a TriSoup.
Figure 4:
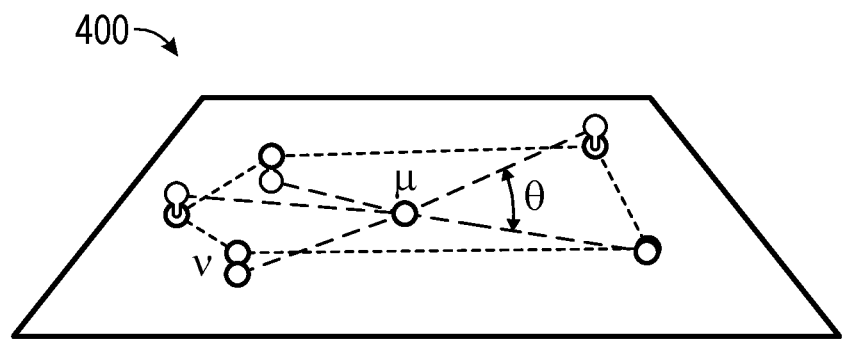
Figure 5:
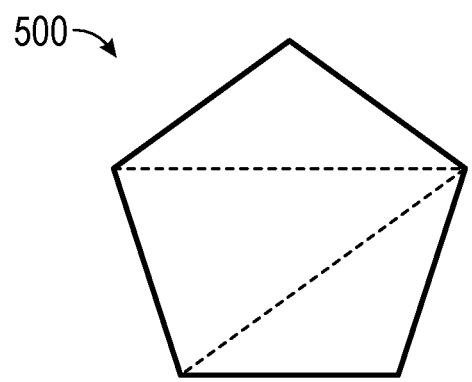

FIGS. 3-5 illustrate determination of triangulation in a TriSoup. As shown in FIG. 3 and FIG. 4, vertices on the selected edges generally do not lie in a plane, nor is there a natural order in which to connect them in a ring to form a polygon. However, they can be projected onto a plane that passes through their centroid and is orthogonal to their minor axis. The minor axis of a set of points $\{v_i\}$ with centroid $\mu$ is the eigenvector of the 3×3 matrix $\Sigma_i(v_i-\mu)(v_i-\mu)^T$ having the smallest eigenvalue. In the plane, the projected positions of the vertices, relative to their centroid, can be expressed in polar coordinates $(\rho_i,\theta_i)$ and sorted by $\theta_i$ to order the vertices in a ring. The polygon with n vertices may then be decomposed in a deterministic way into n−2 triangles. Thus, the surface within a block 300 can be modeled with a small mesh containing n−2 triangles.

Accordingly, to order the vertices on the selected edges into a sequence, let $S=[v_i-\mu]$ be a n×3 list of vertices (e.g., offset from the centroid) in the block. Then, perform a 3×3 principal component analysis of $SS^T$ to obtain the eigenvectors with the second and third smallest eigenvalues, $\varphi_2$ and $\varphi_3$, and determine the components of each vertex in terms of these eigenvectors (e.g., $a_i=(v_i-\mu)\cdot\varphi_2$, $b_i=(v_i-\mu)\cdot\varphi_3$). Next, sort the vertices by their angle around the centroid by sorting on $\theta_i=a\tan 2(a_i,b_i)$. Once this sequence is determined, connect the vertices in a triangular pattern (e.g., a predetermined triangular pattern). FIG. 4 illustrates an example of the fitting of a plane 400 through the centroid of non-coplanar vertices, projecting the vertices onto the plane, and sorting the vertices by their angle around their centroid. FIG. 5 illustrates an example of a predetermined triangulation for a shape 500 (e.g., a pentagon).

Figure 6:
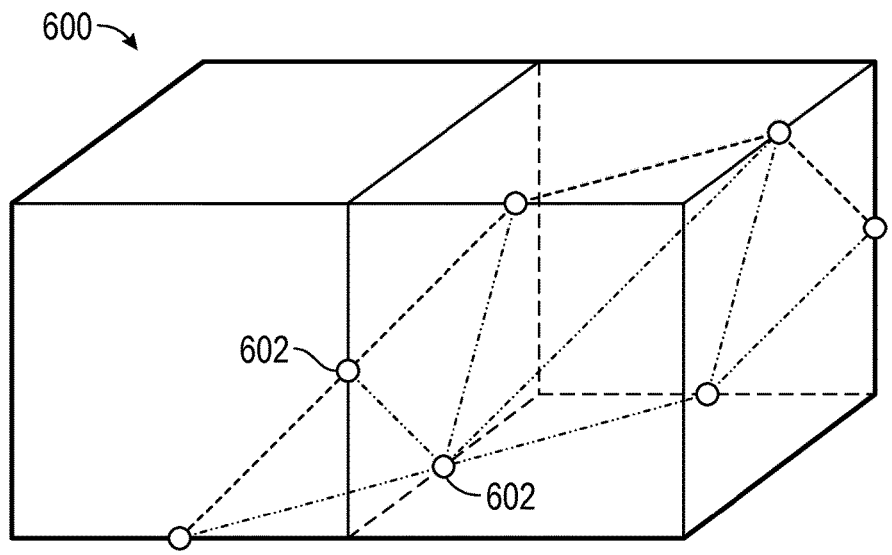
FIG. 6 is a conceptual diagram illustrating continuity across blocks in a TriSoup.

The collection of triangles across all blocks is a triangle "soup," which is not necessarily a watertight mesh, hence the name TriSoup. However, since neighboring blocks share a face, and hence share the edges of the face, as well as share selected edges and any vertices along the selected edges, it is quite likely that the polygons modeling the surface in the two blocks will have a shared edge lying in the shared face. Accordingly, there likely will be continuity of the surface across neighboring blocks. FIG. 6 illustrates continuity across multiple blocks 600 in a TriSoup. In FIG. 6, vertices 602 are a pair of shared vertices on selected edges of two blocks 600.

A second example of representing the surface or portion thereof within a block solely by boundary conditions of the block is an implicit representation. This representation can be called Bezier Volumes, for reasons that will become apparent momentarily. In this implicit representation, the surface or portion thereof within a block is modeled by a level set $\{x:f(x)=c\}$ for some scalar volumetric function $f(x)$ and some level $c\in\mathbb{R}$. The volumetric function $f$ within the block is specified as a Bezier Volume, which is a function canonically defined on a unit cube $x,y,z\in[0,1]$, as $$f(x, y, z) = \sum_{i=0}^{N}\sum_{j=0}^{N}\sum_{k=0}^{N}\binom{N}{i}x^i(1-x)^{N-i}\binom{N}{j}y^j(1-y)^{N-j}\binom{N}{k}z^k(1-z)^{N-k}F_{ijk},$$

where $F_{ijk}$ are real-valued parameters called the control points of the Bezier Volume, and N is a natural number called the degree of the Bezier Volume.

Figure 7:
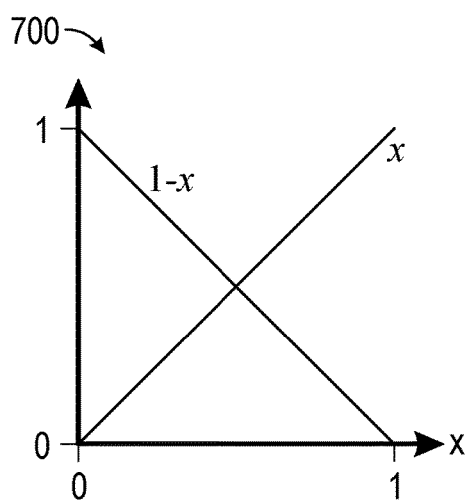
FIG. 7 is a conceptual diagram illustrating degree-1 Bezier basis functions on a unit interval.

FIG. 7 illustrates degree-1 Bezier basis functions 700 on a unit interval. Of particular interest for practical reasons is the Bezier Volume of degree N=1, for which $$f(x, y, z) = \sum_{i=0}^{1}\sum_{j=0}^{1}\sum_{k=0}^{1}x^i(1-x)^{1-i}y^j(1-y)^{1-j}z^k(1-z)^{1-k}f(i, j, k).$$

This is the tri-linear interpolation across the unit cube of the points $\{f(i,j,k):i,j,k\in\{0,1\}\}$ located on the eight corners of the unit cube. Note that across the unit square face of the cube (e.g., the face with z=0), this reduces to the bi-linear interpolation $$f(x, y, 0) = \sum_{i=0}^{1}\sum_{j=0}^{1}x^i(1-x)^{1-i}y^j(1-y)^{1-j}f(i, j, 0),$$

while across the unit edge of the cube (e.g., the edge with y=0 and z=0), this reduces to the linear interpolation $$f(x, 0, 0) = \sum_{i=0}^{1}x^i(1-x)^{1-i}f(i, 0, 0) = (1-x)f(0, 0, 0) + xf(1, 0, 0).$$

Figure 8:
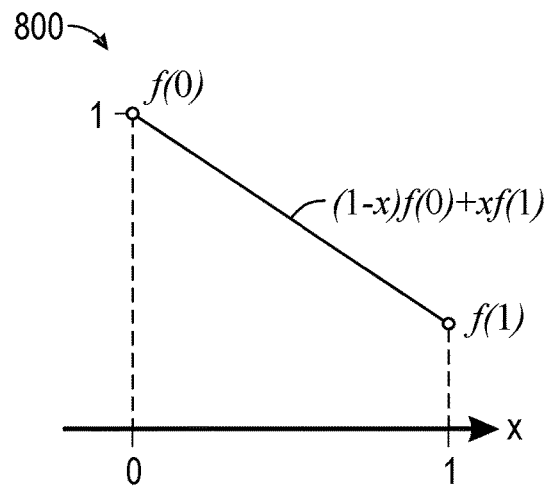
FIG. 8 is a conceptual diagram illustrating linear interpolation across an edge.
Figure 9:
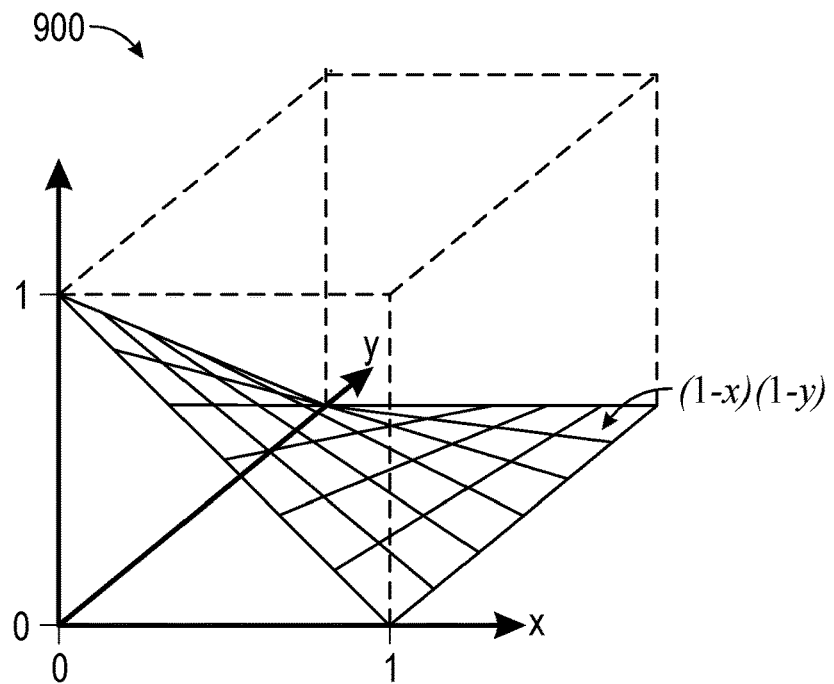
FIGS. 9-12 are conceptual diagrams illustrating degree-1 Bezier basis functions on a unit square.
Figure 10:
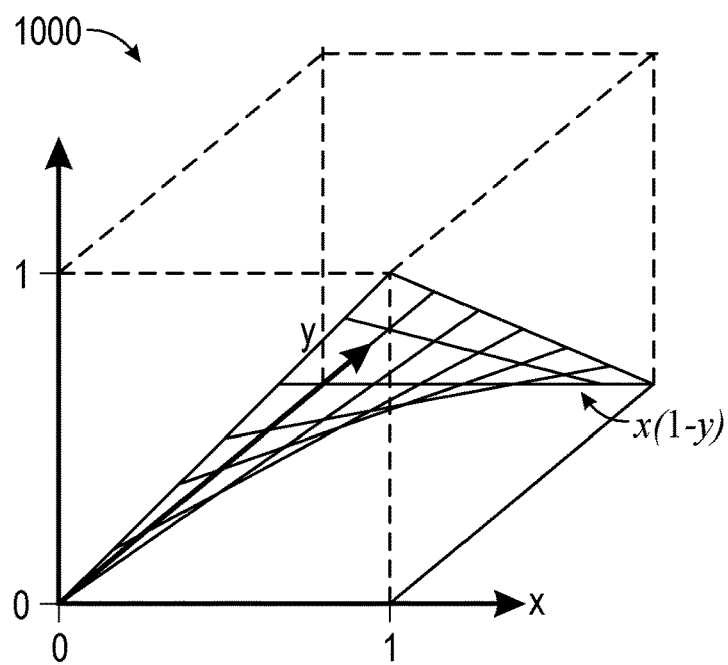
Figure 11:
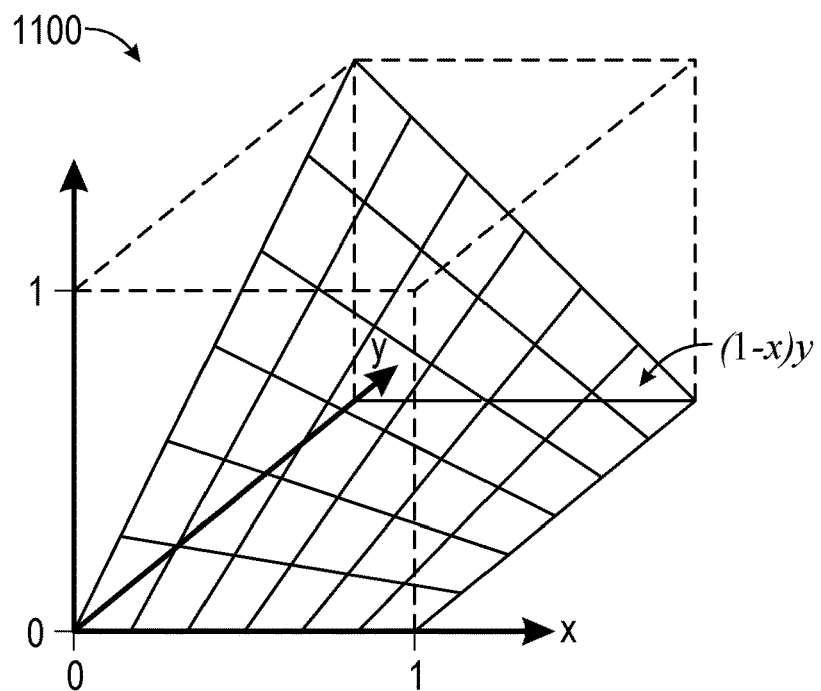
Figure 12:
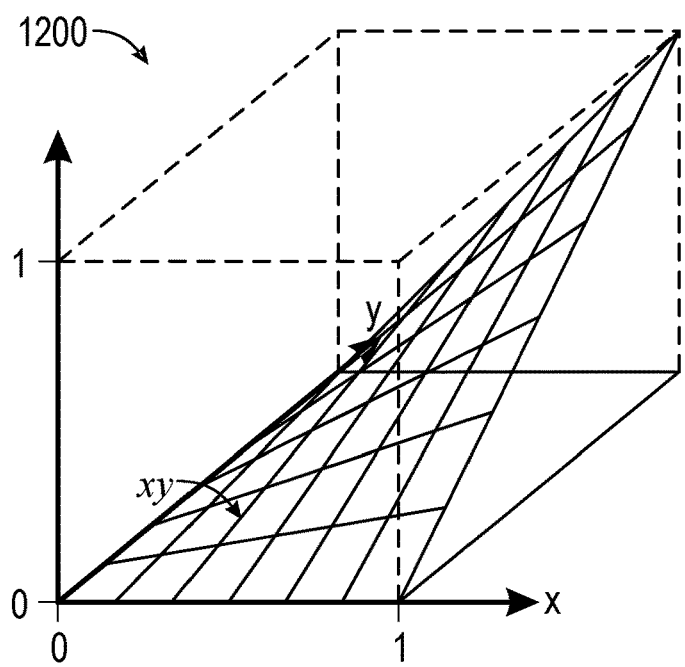
Figure 13:
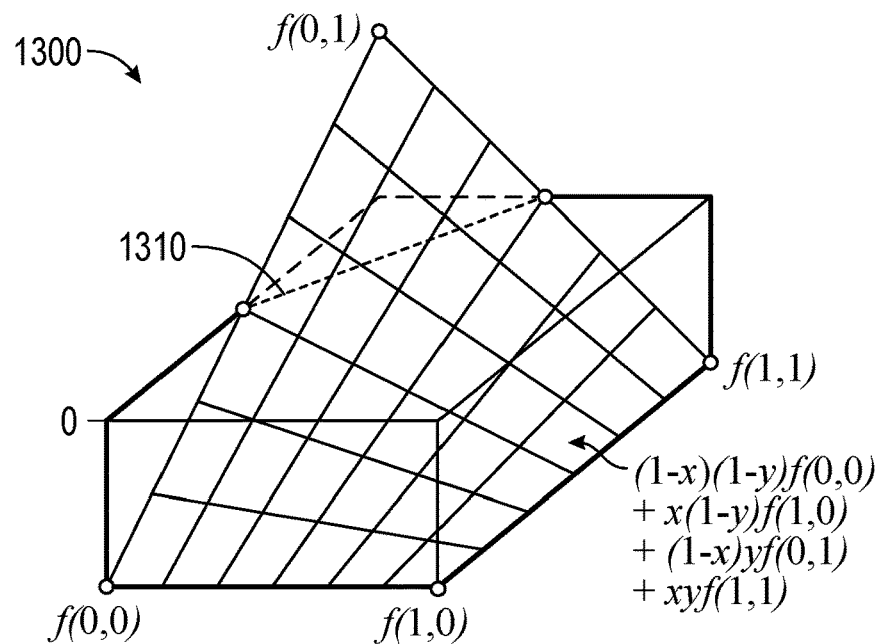
FIG. 13 is a conceptual diagram illustrating a bi-linear interpolation across a face of a block.

FIG. 8 illustrates an example of a linear interpolation 800 across an edge. FIGS. 9-12 illustrate degree-1 Bezier basis functions on unit squares 900, 1000, 1100, and 1200. FIG. 13 illustrates bi-linear interpolation across the face of block, scaled to a unit cube 1300, indicating a 0-level set 1310 of $f$.

For the purposes of modeling the surface or portion thereof within a block, the unit cube is scaled to the size of the block. The Bezier Volume is then a tri-linear interpolation of values of a function on the corners of the block. The surface within the block is then modeled by a level set of the Bezier Volume.

Figure 14:
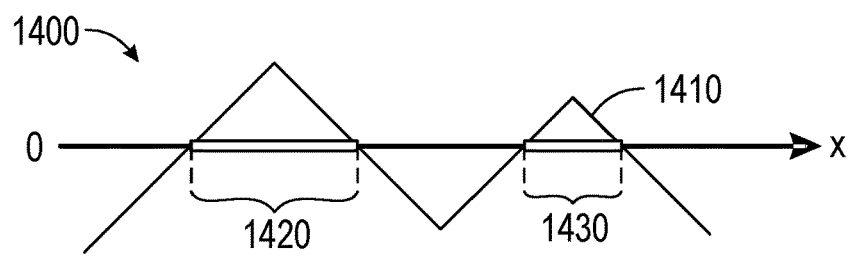
FIG. 14 is a conceptual diagram illustrating a one-dimensional (1D) slice through a signed distance function.
Figure 15:
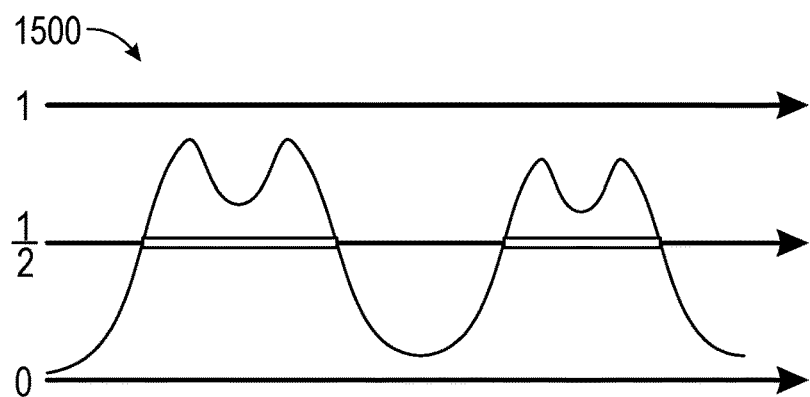
FIG. 15 is a conceptual diagram illustrating a 1D slice through a Bayesian occupancy probability.

Of additional interest for practical reasons is defining $f(x,y,z)$ at a corner $(x,y,z)$ of a block to be the value of the signed distance function or the occupancy probability at that location. If $f$ is the signed distance function, the 0-level set 1300 of $f$ is used to define the surface, while if $f$ is the occupancy probability, the ½-level set of $f$ is used to define the surface. FIG. 14 illustrates a 1D slice 1400 through a signed distance function 1410, with the object indicated by portions 1420 and 1430. FIG. 15 illustrates a 1D slice 1500 through a Bayesian occupancy probability.

The values of $f$ on the four corners of the block are its boundary conditions. Adjacent blocks share a face, and hence share four corners, and hence share the boundary conditions at those corners, and thus interpolate the values of those corners identically across the shared face. Accordingly, the surface cuts the face at identical locations, and hence is continuous across blocks.

There is a relation between the TriSoup and Bezier Volume representation. Given the values of $f$ on the corners of a block, specifically on the endpoints of a block edge i, the location $v_i=x_i+\alpha_iW_ie_i$ at which the edge intersects the surface specified by the Bezier Volume is given by the equation $$c=(1-\alpha_i)f(0)+\alpha_if(1),$$

where $f(0)$ and $f(1)$ are the values of $f$ at the beginning and end of the edge, respectively. That is, $$\alpha_i = \frac{c-f(0)}{f(1)-f(0)}.$$

Figure 16:
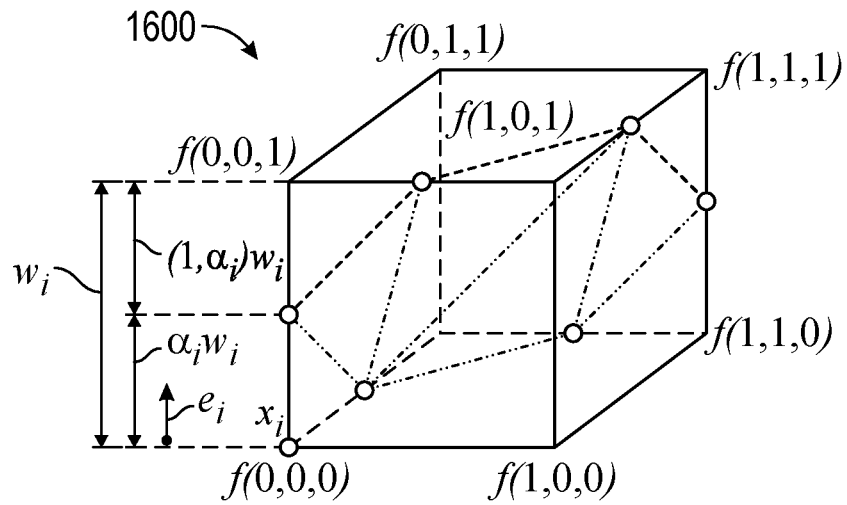
FIG. 16 is a conceptual diagram illustrating relationships between TriSoup parameters and Bezier Volume parameters in three dimensions.
Figure 17:
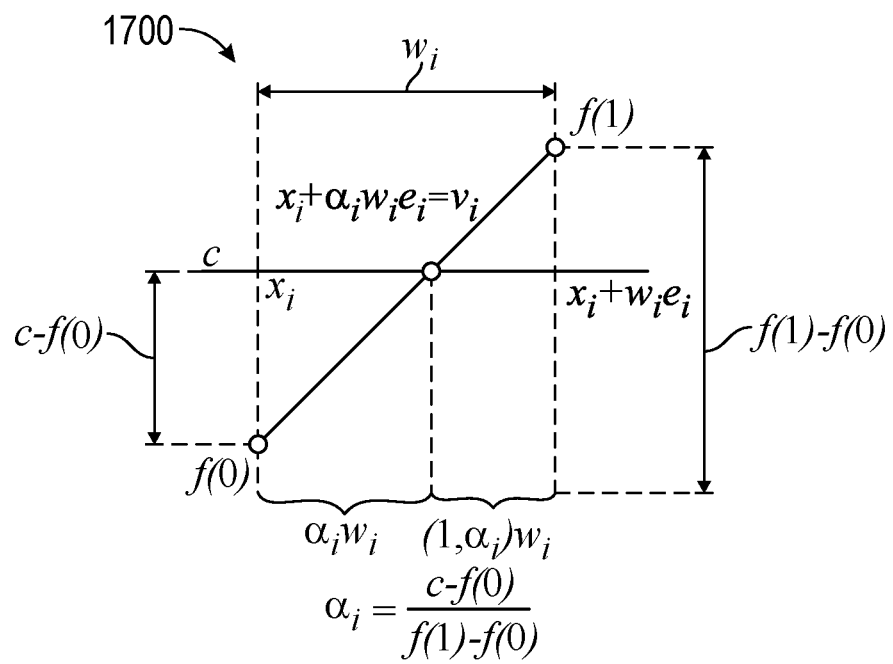
FIG. 17 is a conceptual diagram illustrating relationships between TriSoup parameters and Bezier Volume parameters in one dimension.

If $\alpha_i \in [0,1]$, then edge i intersects the surface, and the edge is selected; otherwise, the edge does not intersect the surface, and the edge is not selected. Thus, the Bezier Volume representation implies a TriSoup representation. FIG. 16 illustrates the relationships 1600 between TriSoup parameters and Bezier Volume parameters in 3D. FIG. 17 illustrates the relationships 1700 between TriSoup parameters and Bezier Volume parameters in 1D.

Conversely, a TriSoup representation constrains the Bezier Volume representation. In particular, each selected edge in the TriSoup representation represents a linear constraint, $c=(1-\alpha_i)f(0)+\alpha_i f(1)$, on a set of possible values $f(0)$ and $f(1)$ on the endpoints of the edge in the Bezier Volume representation. Suppose across all occupied blocks, there are M selected edges i=1, . . . , M with vertices $v_i = x_i + \alpha_i W_i e_i$, and suppose there are N corners with values $f(i_1, j_1, k_1), \ldots, f(i_N, j_N, k_N)$. Then, $$\begin{bmatrix} c \\ \vdots \\ c \end{bmatrix} = A \begin{bmatrix} f(i_1, j_1, k_1) \\ \vdots \\ f(i_N, j_N, k_N) \end{bmatrix},$$

where A is a M×N matrix with two non-zero entries, $1-\alpha_i$ and $\alpha_i$, in the ith row, in columns corresponding to the corners at the beginning and end of edge i.

The system of equations is typically under-determined: M<N. Moreover, if c=0, the coefficients $\{f(i,j,k)\}$ can be determined only up to its sign. So, there is some amount of additional freedom in the Bezier Volume representation not present in the TriSoup representation. However, it is straightforward to add additional equations to determine the Bezier Volume coefficients uniquely from the TriSoup constraints.

Figure 18:
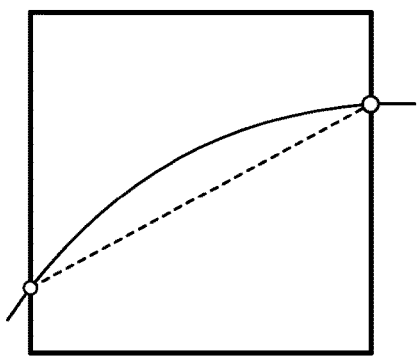
FIG. 18 is a conceptual diagram illustrating a multiresolution representation of a blockable surface at a first (e.g., coarse) resolution.
Figure 19:
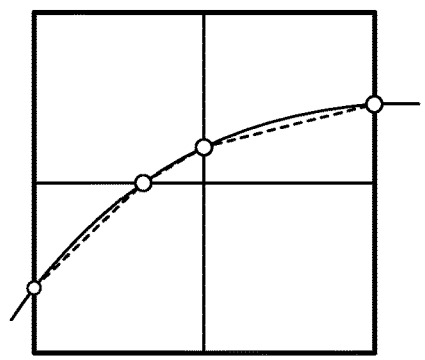
FIG. 19 is a conceptual diagram illustrating a multiresolution representation of a blockable surface at a second (e.g., fine) resolution.

A blockable representation is said to be "multiresolution" if the blocks can be subdivided into sub-blocks. If a block is subdivided into sub-blocks, then new edges, or new corners, are introduced to the representation. The values of $\alpha_i$ on these new edges, or the values of $f$ on these new corners, become parameters in the new representation, called the refined representation. FIGS. 18 and 19 illustrate a multiresolution representation of a blockable surface, with FIG. 18 showing a first (e.g., coarse) resolution 1800, and with FIG. 19 showing a second (e.g., fine) resolution 1900.

In a multiresolution blockable representation, the subdivision of blocks can be done recursively. If an occupied block is divided into sub-blocks, then those sub-blocks that are occupied may likewise be sub-divided. The subdivision may be done recursively to an arbitrary level of precision, for example, until the surface within each block is well-approximated to within a desired margin of error.

Such a recursive subdivision can be represented by a tree (e.g., an octree, such as an SVO), in which each node in the tree corresponds to a different block, and children of the node in the tree correspond to the smaller blocks that subdivide the block. The tree may be grown to an arbitrary depth, for example to reach the margin of error. The leaves of the tree need not all lie at the same depth. A tree whose leaves do not all lie at the same depth is called a pruned subtree. FIG. 20 illustrates a 2D example of a multiresolution representation 2000 of a blockable surface, and FIG. 21 illustrates the structure of its corresponding octree 2100.

Bezier volumes are the extension to 3D of 1D Bezier curves and 2D Bezier patches. Adjacent Bezier curves can be "linked up" to form a B-spline curve, and adjacent Bezier patches can be linked up to form a B-spline surface. In a similar way, adjacent Bezier volumes can be linked up to form a B-spline volume. To be specific, a cardinal B-spline volume of order p is a function $$f(x) = \sum_{n \in \mathbb{Z}^3} F_n B^{(p)}(x-n),$$

where $B^{(p)}(x-n)$ is a 3D basis function at vector integer shift $n-\mathbb{Z}^3$, and $F_n$ is its coefficient. In turn, $B^{(p)}(x)=B^{(p)}(x,y,z)=B^{(p)}(x)B^{(p)}(y)B^{(p)}(z)$ is the tensor product of 1D basis functions $B^{(p)}(x)$, $B^{(p)}(y)$, and $B^{(p)}(z)$, where $B^{(p)}(x)$ can be defined recursively as $$B^{(1)}(x) = \begin{cases} 1 & -0.5 \leq x \leq 0.5 \\ 0 & \text{otherwise} \end{cases}$$

and $$B^{(p)}(x) = \int B^{(1)}(t) B^{(p-1)}(x-t) dt$$

for p>1. It can be seen that $B^{(p)}(x)$ is the p-fold convolution of $B^{(1)}(x)$ with itself. FIGS. 22-25 illustrate $B^{(p)}(x)$ for p=1,2,3,4.

Of particular interest are situations with p=2, or linear B-splines, for which $$B^{(2)}(x) = \begin{cases} 1+x & -1 \leq x \leq 0 \\ 1-x & 0 \leq x \leq 1 \\ 0 & \text{otherwise} \end{cases}.$$

It can be seen that $B^{(2)}(x)$ is continuous, and hence $B^{(p)}(x,y,z)$ is continuous, and hence $f(x,y,z)$ is continuous. Furthermore, unlike cardinal B-splines of higher order, $B^{(2)}(x-i)=0$ at all integer shifts $i \neq 0$. Thus $f(n)=F_n$ for all $n \in \mathbb{Z}^3$, and it can be seen that for $x \in [i, i+1]$, $y \in [j, j+1]$, and $z \in [k, k+1]$, $$\begin{aligned} f(x, y, z) = & f(i, j, k)(i+1-x)(j+1-y)(k+1-z) + \\ & f(i+1, j, k)(x-i)(j+1-y)(k+1-z) + \\ & f(i, j+1, k)(i+1-x)(y-j)(k+1-z) + \\ & f(i+1, j+1, k)(x-i)(y-j)(k+1-z) + \\ & f(i, j, k+1)(i+1-x)(j+1-y)(z-k) + \\ & f(i+1, j, k+1)(x-i)(j+1-y)(z-k) + \\ & f(i, j+1, k+1)(i+1-x)(y-j)(z-k) + \\ & f(i+1, j+1, k+1)(x-i)(y-j)(z-k). \end{aligned}$$

This is a Bezier volume of degree N=1 shifted to location (i,j,k). That is, a cardinal B-spline volume of order p=2 is a collection of Bezier volumes of degree N=1 that agree on the integer grid $\mathbb{Z}^3$, known as the knots of the cardinal B-spline.

The cardinal B-splines can be scaled by a factor of $2^{-l}$, where l is the scale or level of detail. Let $(2^{-l}\mathbb{Z})^3$ be the collection of knots, let $\mathcal{A}_l$ be a collection of all cubes of width $2^{-l}$ that partition $\mathbb{R}^3$, $$\mathcal{A}_l = \{2^{-l}[i, i+1] \times 2^{-l}[j, j+1] \times 2^{-l}[k, k+1] : i, j, k \in \mathbb{Z}\},$$

and let $V_l$ be the space of functions $f_l: \mathbb{R}^3 \to \mathbb{R}$ that are continuous and piecewise tri-linear over the cubes in $\mathcal{A}_l$, $$V_l = \left\{ f_l : f_l(x) = \sum_{n \in \mathbb{Z}^3} F_{l,n} B^{(2)}(2^l x - n) \right\}.$$

Figure 26:
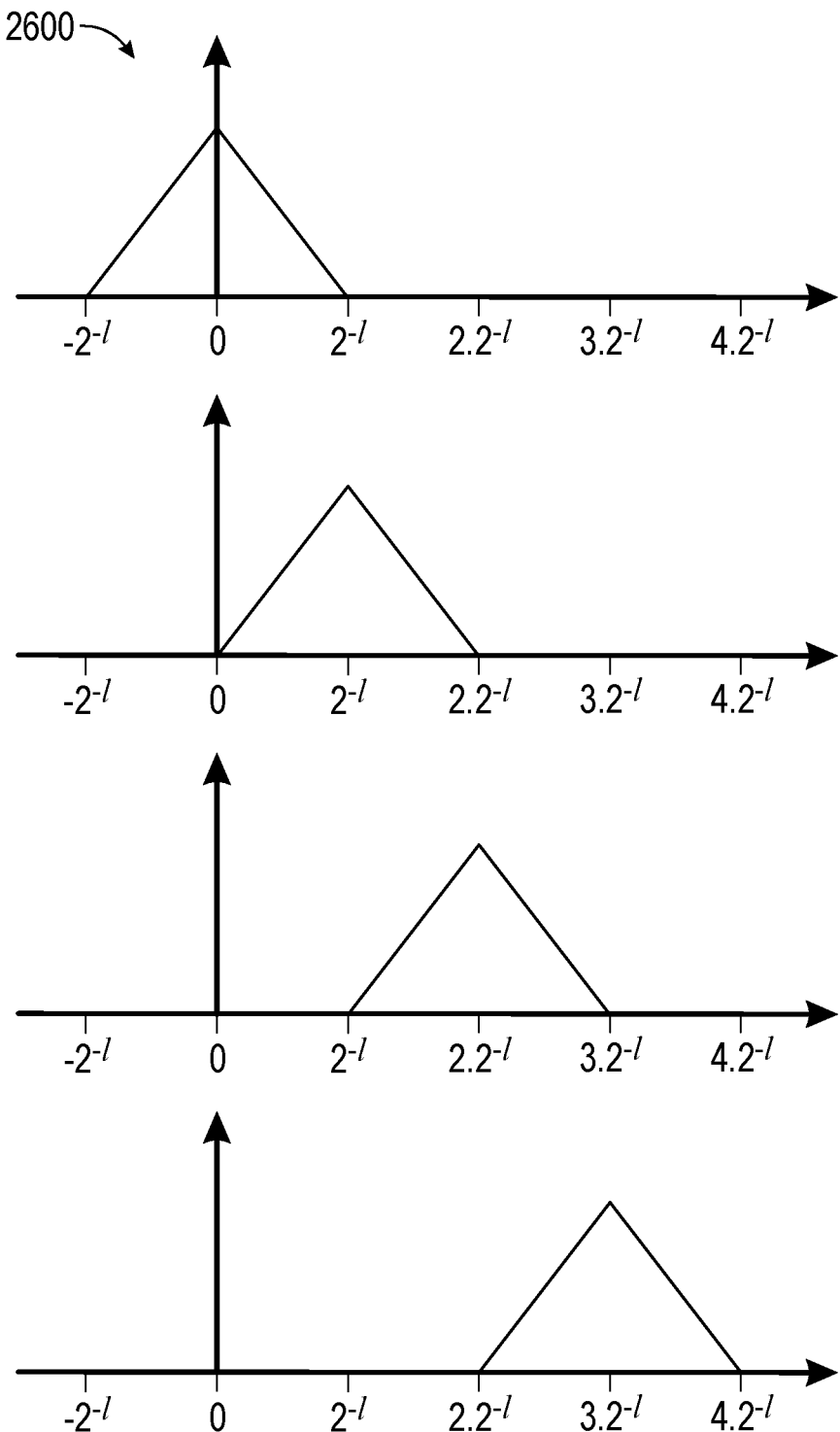
FIG. 26 is a conceptual diagram illustrating 1D basis functions for $V_l$.
Figure 27:
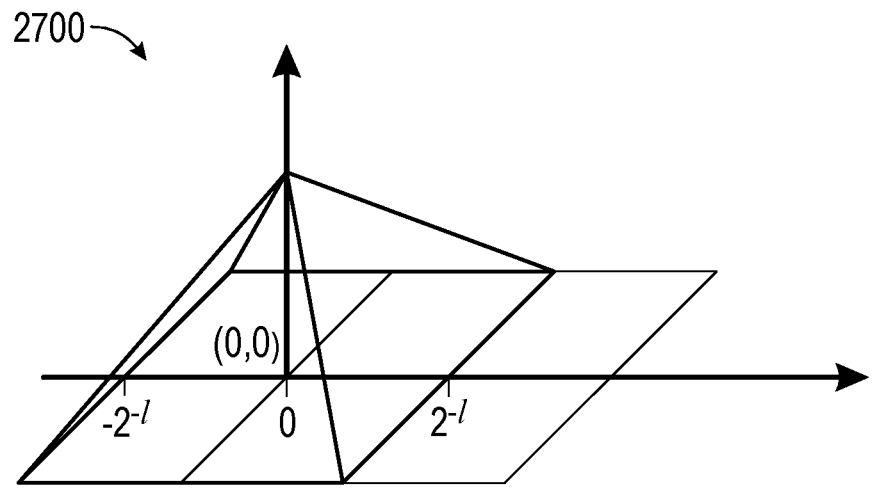
FIGS. 27-30 are conceptual diagrams illustrating 2D basis functions for $V_l$.
Figure 28:
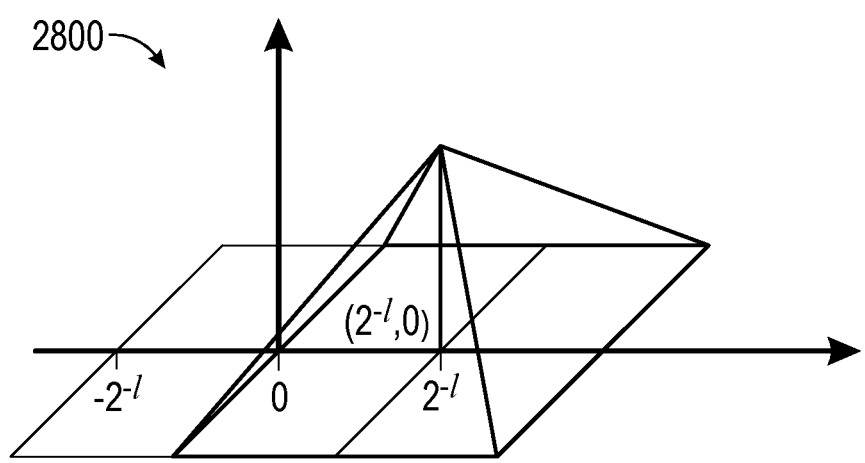
Figure 29:
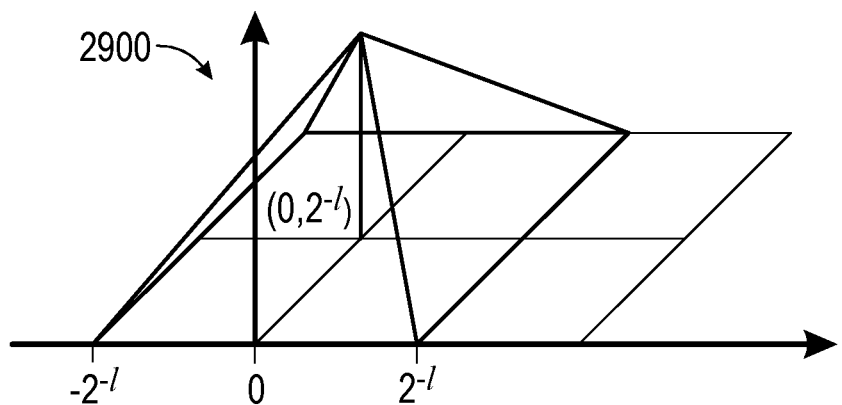
Figure 30:
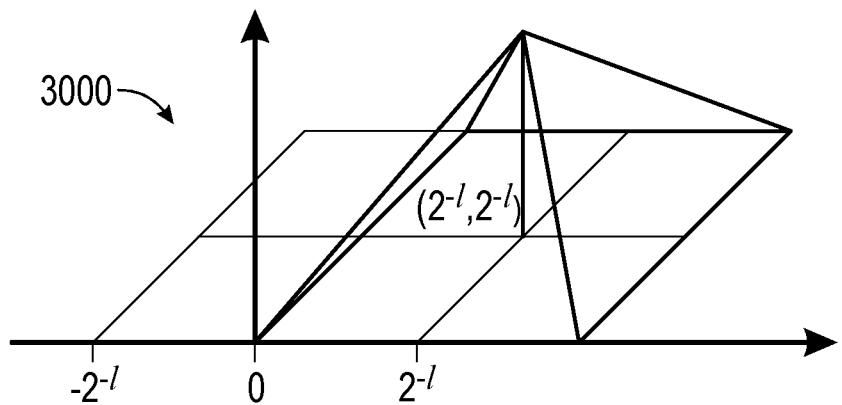
Figure 31:
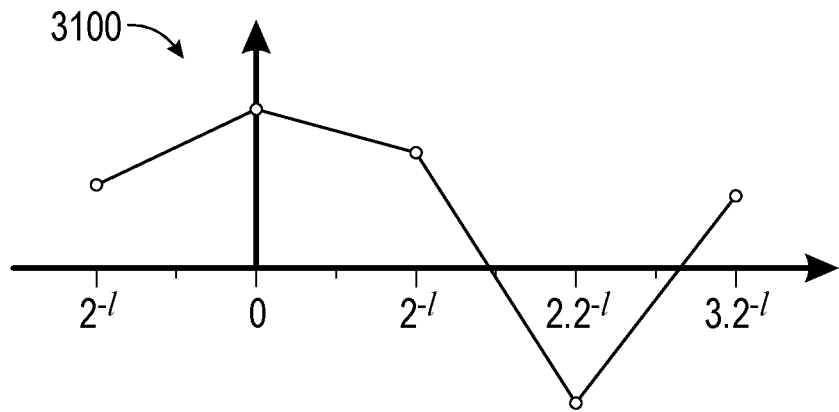
FIG. 31 is a conceptual diagram illustrating 1D $f_l \in V_l$.
Figure 32:
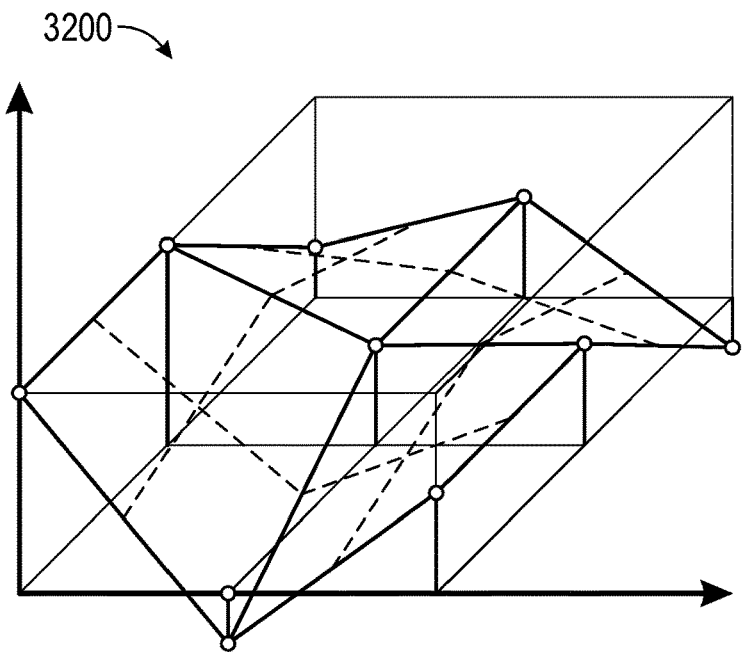
FIG. 32 is a conceptual diagram illustrating 2D $f_l \in V_l$.

$V_l$ is a vector space, since if $f_l, f_l' \in V_l$, then $af_l + bf_l' \in V_l$ for all $a, b \in \mathbb{R}$. FIG. 26 illustrates 1D basis functions 2600 for $V_l$. FIGS. 27-30 illustrate 2D basis functions 2700, 2800, 2900, and 3000 for $V_l$. FIG. 31 illustrates a representation 3100 of 1D $f_l \in V_l$, and FIG. 32 illustrates a representation 3200 of 2D $f_l \in V_l$. Then, if $f_l \in V_l$ (i.e., $f_l$ is continuous and piecewise tri-linear over the cubes in $\mathcal{A}_l$), then also $f_l \in V_{l+1}$ (i.e., $f_l$ is continuous and piecewise linear over the smaller cubes in $\mathcal{A}_{l+1}$). Thus, $V_l \subseteq V_{l+1}$.

Figure 33:
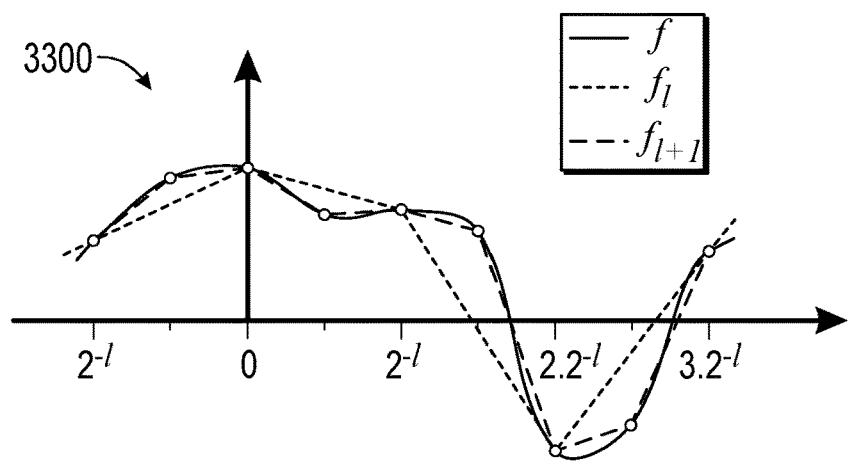
FIG. 33 is a conceptual diagram illustrating 1D $f_l \in V_l$ and $f_{l+1} \in V_{l+1}$.
Figure 34:
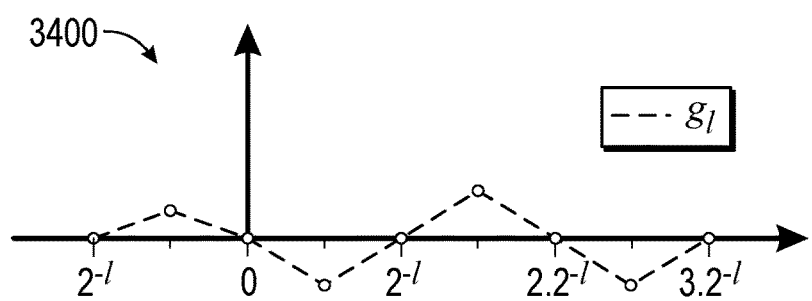
FIG. 34 is a conceptual diagram illustrating 1D $g_l \in W_l$.
Figure 35:
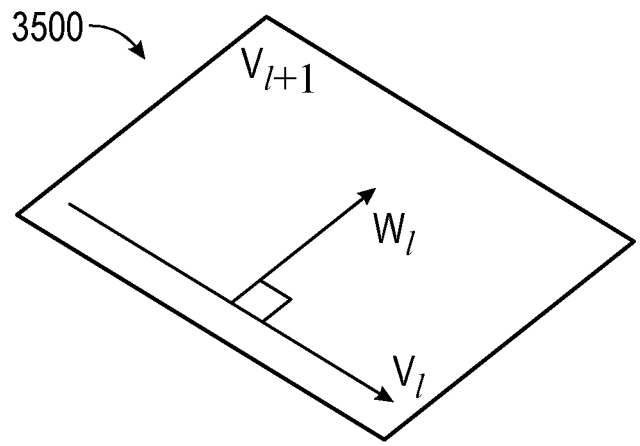
FIG. 35 is a conceptual diagram illustrating $V_l \oplus W_l = V_{l+1}$.

A function $f_l \in V_l$ is characterized by its coefficients $F_{l,n} = f_l(2^{-l}n)$, that is, the values of $f_l(x)$ on all $x \in (2^{-l}\mathbb{Z})^3$, that is, on the corners of the cubes in $\mathcal{A}_l$, or on the knots of the cardinal B-spline at scale l. Let $f: \mathbb{R}^3 \to \mathbb{R}$ be an arbitrary function. Denote by $f_l = f \circ V_l$ the projection of $f$ onto $V_l$ given by $f_l(x) = \Sum_{n \in \mathbb{Z}^3} F_{l,n} B^{(2)}(2^l x - n)$, where $F_{l,n} = f(2^{-l}n)$. Then $f \circ V_l = f \circ V_{l+1} \circ V_l$. That is, projecting $f$ onto $V_l$ can be done in two steps, by first projecting onto $V_{l+1}$ (i.e., $f_{l+1} = f \circ V_{l+1}$) and then onto $V_l$ (i.e., $f_l = f_{l+1} \circ V_l$). The difference $g_l(x) = f_{l+1}(x) - f_l(x)$ is a function that is piecewise tri-linear over the cubes of width $2^{-(l+1)}$ in $\mathcal{A}_{l+1}$, but is constrained to be zero on the knots $(2^{-l}\mathbb{Z})^3$. Let $W_l$ be the space of all such constrained functions. It can be seen that $W_l \subseteq V_{l+1}$, since $g_l \in V_{l+1}$. Also, $W_l$ is a vector space, since if $g_l, g_l', \in W_l$, then $ag_l + bg_l' \in W_l$ for all $a, b \in \mathbb{R}$. Additionally, $g_l \circ V_l$ is the all-zero function, so $W_l$ is orthogonal to $V_l$ under this projection. Thus, $W_l$ is the orthogonal complement of $V_l$ in $V_{l+1}$, or $V_l \oplus W_l = V_{l+1}$. FIG. 33 illustrates a representation 3300 of 1D $f_l \in V_l$, $f_{l+1} \in V_{l+1}$, and FIG. 34 illustrates a representation 3400 of $g_l \in W_l$. FIG. 35 illustrates a representation 3500 of $V_l \oplus W_l = V_{l+1}$.

A function $g_l \in W_l \subseteq V_{l+1}$ is characterized by its coefficients $G_{l+1,n} = g_l(2^{-(l+1)}n)$, $n \in (2^{-(l+1)}\mathbb{Z})^3$; however, $g_l(2^{-l}n) = 0$ for all $n \in (2^{-l}\mathbb{Z})^3$. Thus, $g_l \in W_l$ is characterized by the coefficients $G_{l+1,n}$ for all $n \in (2^{-(l+1)}\mathbb{Z})^3 \setminus (2^{-l}\mathbb{Z})^3$. Thus, to specify a function $f_{l+1} = f \circ V_{l+1}$, it suffices to specify the coefficients of $f_l = f \circ V_l$ (i.e., $F_{l,n} = f(2^{-l}n)$ for all $n \in (2^{-l}\mathbb{Z})^3$) followed by the coefficients of $g_l = f_{l+1} - f_l \in W_l$ not known to be zero (i.e., $G_{l+1,n}$ for all $n \in (2^{-(l+1)}\mathbb{Z})^3 \setminus (2^{-l}\mathbb{Z})^3$).

This strategy can be followed recursively to any level of detail, namely, $f_L = f_0 + g_0 + \ldots + g_{L-1}$, where $g_l = f_{l+1} - f_l \in W_l$ for $l = 0, \ldots, L-1$ and $V_L = V_0 \oplus W_0 \oplus \ldots \oplus W_{L-1}$. This is a wavelet decomposition of $f$ in the tri-linear cardinal B-spline basis.

Thus, if $f$ is a signed distance function (or occupancy probability), and $f_L = f \circ V_L$, is its projection onto a continuous function that is piecewise tri-linear across cubes in $\mathcal{A}_L$, then $f_L$ is an approximation of $f$ and the implicit surface $\{x: f_L(x) = c\}$ is an approximation to the surface $\{x: f(x) = c\}$, where $c = 0$ if $f$ is a signed distance function, and $c = \frac{1}{2}$ if $f$ is an occupancy probability. Note that the cubes in $\mathcal{A}_L$ are the tri-linear Bezier volumes within which the surface is modeled. Thus, if L is large, the surface is finely approximated.

To describe the approximation surface, one can describe just the coefficients $F_{0,n}$ for all $n \in \mathbb{Z}^3$ followed by the coefficients $G_{l+1,n}$ for all $n \in (2^{-(l+1)}\mathbb{Z})^3 \setminus (2^{-l}\mathbb{Z})^3$, for $l = 0, \ldots, L-1$. However, even fewer coefficients can be used. The most important coefficients are those on the corners of the occupied blocks at each level. To be specific, let the set of blocks $\mathcal{B}_l \subseteq \mathcal{A}_l$ be the subset of cubes in $\mathcal{A}_l$ that are occupied. Let $\mathcal{C}_l$ be the set of all corners of blocks in $\mathcal{B}_l$.

The only coefficients at level l that affect the value of $f_L$ inside the blocks of $\mathcal{B}_l$ are those on $\mathcal{C}_l$. Thus, to describe $f_L$, one needs only to describe the coefficients $F_{0,n}$ for all $n \in \mathcal{C}_0$ followed by the coefficients $G_{l+1,n}$ for all $n \in \mathcal{C}_{l+1} \setminus \mathcal{C}_l$, for $l = 0, \ldots, L-1$.

Figure 36:
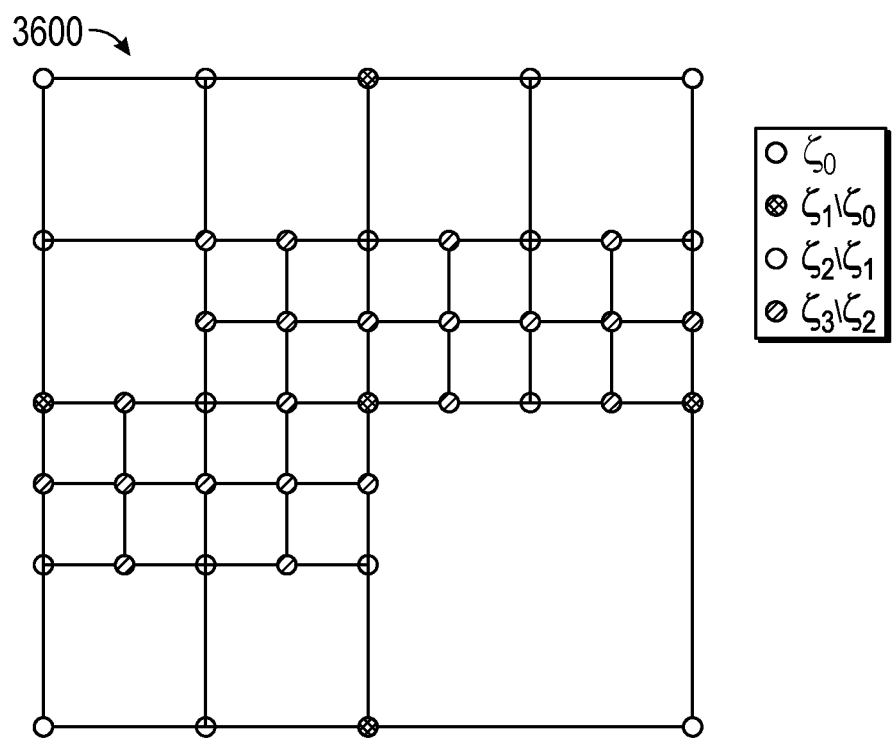
FIG. 36 is a conceptual diagram illustrating 2D blocks that define multiple resolutions.
Figure 37:
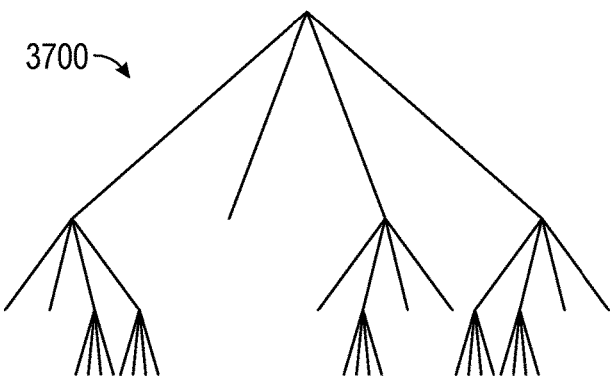
FIG. 37 is a conceptual diagram illustrating a 2D octree that corresponds to the 2D blocks shown in FIG. 36.
Figure 38:
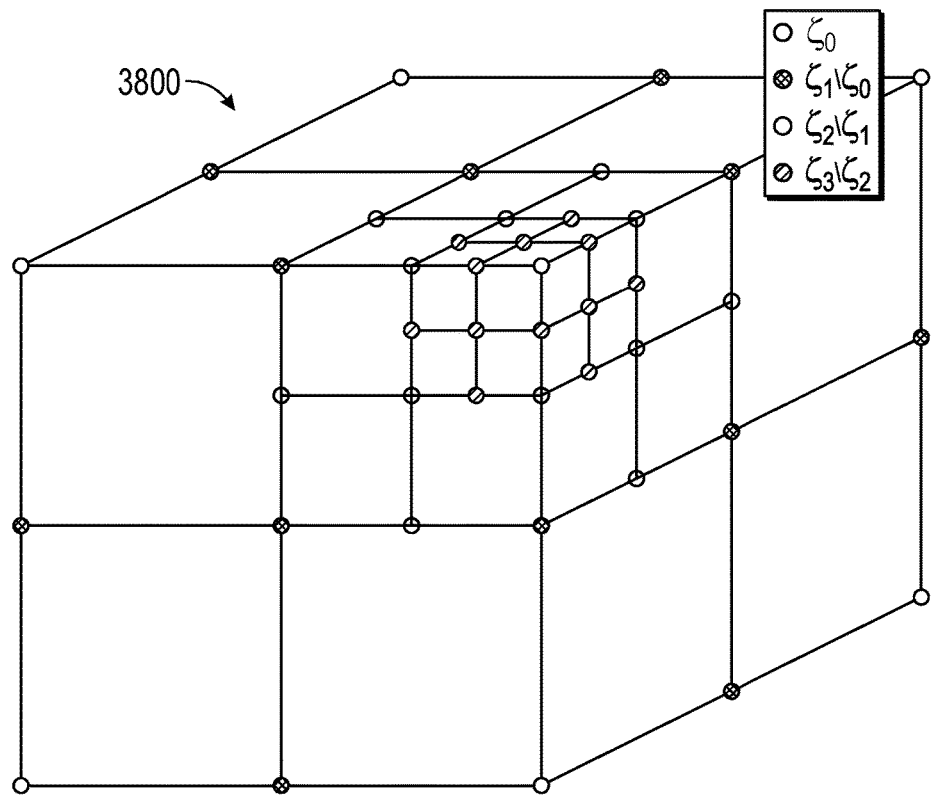
FIG. 38 is a conceptual diagram illustrating 3D blocks that define multiple resolutions.
Figure 39:
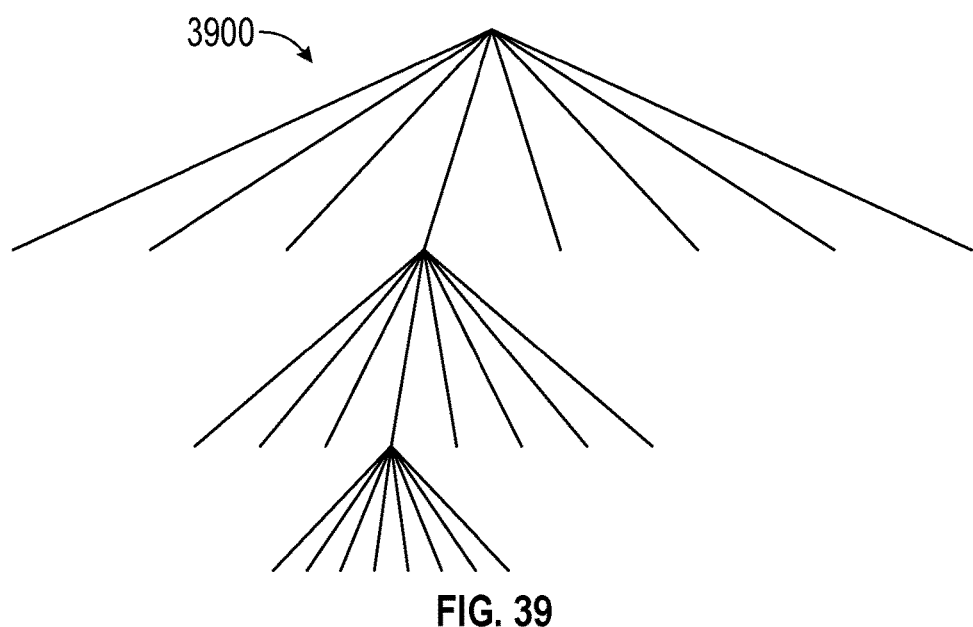
FIG. 39 is a conceptual diagram illustrating a 3D octree that corresponds to the 3D blocks shown in FIG. 38.

The sets of occupied blocks $\mathcal{B}_l$ for $l = 0, \ldots, L$ (and hence the sets of corners $\mathcal{C}_l$ for $l = 0, \ldots, L$) can be compactly specified by an octree with depth L. FIG. 36 illustrates a 2D example of blocks 3600 in such an octree, and FIG. 37 illustrates its corresponding structure 3700. FIG. 38 illustrates a 3D example of blocks 3800 in such an octree, and FIG. 39 illustrates its corresponding structure 3900.

Thus, to compress the approximation surface $f_L$, it suffices to compress the octree with depth L (which can be done using standard lossless compression methods) and then to compress the coefficients $F_{0,n}$ for all $n \in \mathcal{C}_0$ followed by the coefficients $G_{l+1,n}$ for all $n \in \mathcal{C}_{l+1} \setminus \mathcal{C}_l$, for $l = 0, \ldots, L-1$. The coefficients $F_{0,n} = f(n)$ can be compressed using, for example, uniform scalar quantization followed by an entropy code. These can be decompressed into approximate coefficients $\hat{F}_{0,n} = \hat{f}(n)$. Then, for each $l = 0, \ldots, L-1$, the coefficients $G_{l+1,n} = g_l(2^{-(l+1)}n) = f_{l+1}(2^{-(l+1)}n) - \hat{f}_l(2^{-(l+1)}n)$ can be compressed using, again for example, uniform scalar quantization followed by an entropy code. These can be decompressed into approximate coefficients $\hat{G}_{l+1,n} = \hat{g}_l(2^{-(l+1)}n) = \hat{f}_{l+1}(2^{-(l+1)}n) - \hat{f}_l(2^{-(l+1)}n)$, thus obtaining $\hat{f}_{l+1}(2^{-(l+1)}n) = \hat{f}_l(2^{-(l+1)}n) + \hat{G}_{l+1,n}$. Note that in the definition of $G_{l+1,n}$ the quantized value of $\hat{f}_l(2^{-(l+1)}n)$ is used to prevent error propagation. In the end, the values of $\hat{f}_L(2^{-L}n)$ for all $2^{-L}n \in \mathcal{C}_L$ are obtained. From these, any value of $\hat{f}_L(x)$ for any x in any block in $\mathcal{B}_L$ can be computed by tri-linear interpolation.

It is possible that even fewer coefficients can be transmitted. Frequently, the quantized wavelet coefficients $\hat{G}_{l+1,n}$ are zero, particularly in regions where the surface is flat and when l is large (e.g., so that the surface is approximately flat over the block). If all the quantized wavelet coefficients within the boundaries of a block are zero (e.g., not including the wavelet coefficients at the corners of the block), that is, if all the quantized wavelet coefficients of the descendants of the block are zero, then the octree can be pruned away below the block, leaving the block (e.g., with possibly non-zero coefficients at its corners) as a leaf of the octree. Upon decoding, the block will be a Bezier volume in its own right.

Determining whether all the quantized wavelet coefficients of the descendants below a block are zero typically is predicated on all the wavelet coefficients of all the descendants of the block being evaluated, quantized, and checked to see if they are zero. Thus, pruning the octree is typically performed either bottom up or recursively.

A pruned octree (e.g., a pruned SVO) may benefit from special signaling to indicate where to prune. One approach is to use one bit of information at each node of the tree. For example, if the node is an internal node, then the bit is 1, while if the node is an external node (i.e., a leaf), the bit is zero. This indicates to the decoder whether the node should be split or not.

The pruned octree thus constitutes a "non-zero tree" for the wavelet coefficients, playing a similar role as the "zero-tree" in some wavelet coding approaches. That is, the pruned octree is a way to represent and encode which wavelet coefficients must be zero and which wavelet coefficients can be non-zero. Other pruning criteria, besides whether all the quantized wavelet coefficients are zero below a node, can also be considered. For example, the octree can be pruned using a rate-distortion criterion.

The explicit surface representation TriSoup can be compressed analogously. First, the octree may be pruned (e.g., using a rate-distortion criterion). Then, the octree can be compressed and losslessly transmitted exactly as in the Bezier Volume case. Let $\mathcal{B}$ be the set of blocks at the leaves of the octree, and let $\varepsilon$ be the set of edges of these blocks. The set of selected edges (e.g., the edges that intersect a surface) can be determined by $|\varepsilon|$ bits, or even fewer using prediction, context modeling, or both, as well as arithmetic coding. Then, for each selected edge i, the fraction $\alpha_i$ can be compressed, for example, by uniform scalar quantization followed by entropy coding. This determines the position along edge i of the vertex $v_i = x_i + \hat{\alpha}_i W_i e_i$, where $\hat{\alpha}_i$ is the decoded version of $\alpha_i$.

The ability to specify a 3D vertex with only a single scalar value is a major reason that this type of representation is highly compressible. Experiments show that, even with elementary fixed-length lossless coding for the octree occupancy bytes, for the set of selected edges, and for the vertex positions, less than 7.5 bits per vertex can be achieved. This compares favorably with the best mesh compression algorithms available to date, particularly as it is for a blockable representation, which offers the benefit of a highly regular processing structure. Further compression can be achieved by prediction, context modeling, or both, of the selected edges and their vertex positions. As one example, if the edge is shared by four occupied blocks, it is more likely to be selected (e.g., intersected by an edge) than if it is shared by fewer occupied blocks, or not shared at all.

Compression, also known as encoding, is performed by a compressor, also known as an encoder. The input to the encoder is a surface representation. The output from the encoder is a data stream (e.g., a bit stream). Decompression, also known as decoding, is performed by a decompressor, also known as a decoder. The input to the decoder is the data stream (e.g., the bit stream). The output from the decoder is a reproduction of the surface representation. The fidelity of the reproduction of the surface representation to the surface representation input to the encoder is subject to the bit rate or number of bits in the bit stream, among other parameters.

At a suitable decoder, once the representation of the surface is decoded, rendering the surface within each block is computationally simple. In the case of TriSoup, since the surface is explicitly represented by a small mesh of triangles, any rendering method suitable for triangles will do. In the case of Bezier Volumes, if the block has at least one corner whose value is greater than c and one corner whose value is less than c, then the block is said to have a c-crossing. Blocks with a c-crossing contain a surface and can be subdivided into sub-blocks. Values on the corners of the sub-blocks can be determined by evaluating $f$ at the appropriate locations. Sub-blocks that have a c-crossing can be recursively subdivided until the desired rendering precision is achieved.

Motion of the surface is represented by trajectories over time of the position of the vertices in the case of TriSoup or the trajectories over time of the positions of the corners of the blocks. These trajectories may be compressed in various ways, including delta coding, transform coding, wavelet coding, spline coding, or any suitable combination thereof.

Figure 40:
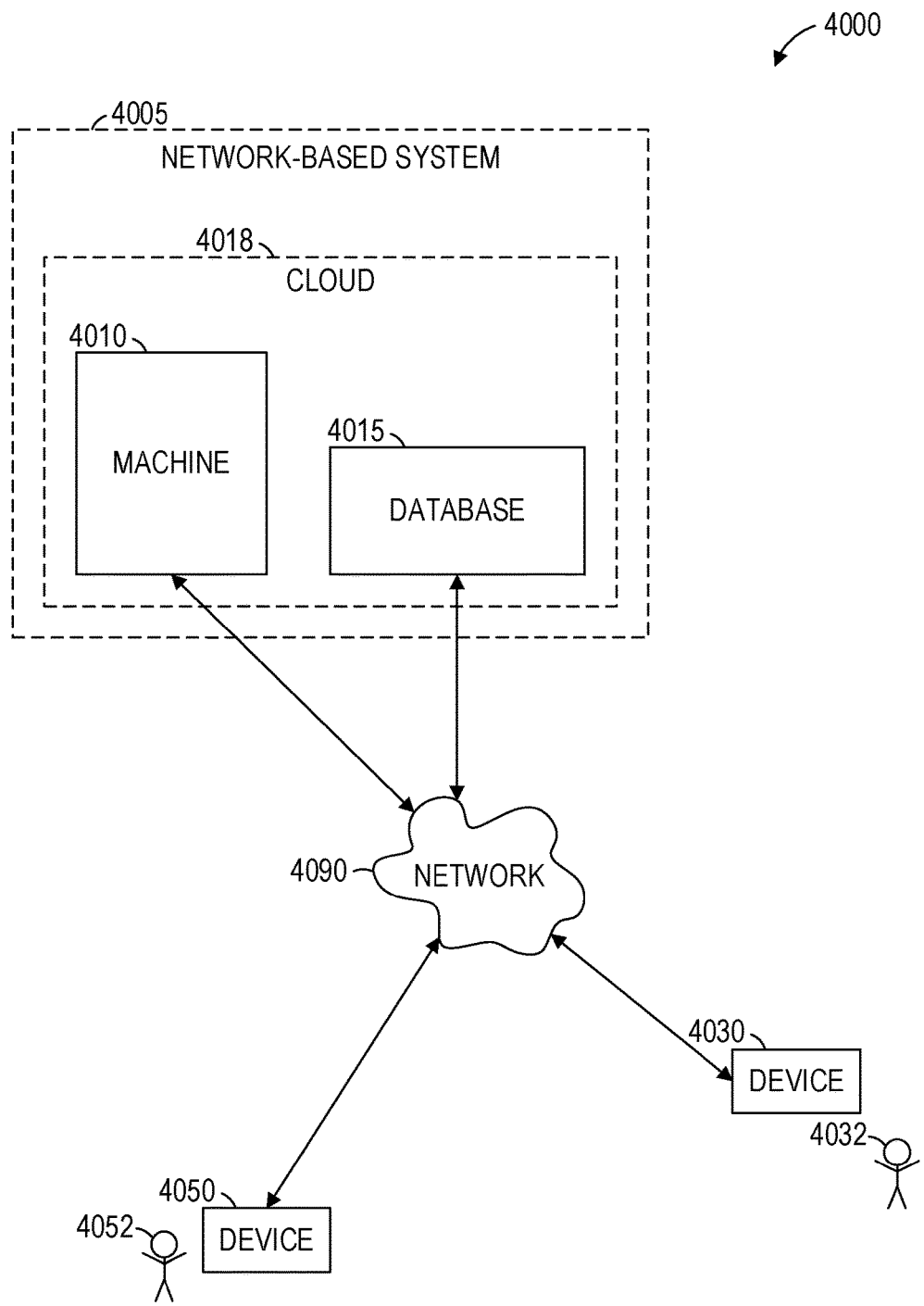
FIG. 40 is a network diagram illustrating a network environment suitable for generating, compressing, decompressing, rendering, all or part of any of the blockable surface representations discussed herein, according to some example embodiments.

FIG. 40 is a network diagram illustrating a network environment 4000 suitable for generating, compressing, decompressing, rendering, all or part of any of the blockable surface representations discussed herein (e.g., all or part of any data structure defining or otherwise representing a blockable surface), according to some example embodiments. The network environment 4000 includes a machine 4010, a database 4015, and devices 4030 and 4050, all communicatively coupled to each other via a network 4090. The machine 4010, with or without the database 4015, may form all or part of a cloud 4018 (e.g., a geographically distributed set of multiple machines configured to function as a single server), which may form all or part of a network-based system 4005 (e.g., a cloud-based server system configured to provide one or more network-based services to the devices 4030 and 4050). The machine 4010 and the devices 4030 and 4050 may each be implemented in a special-purpose (e.g., specialized) computer system, in whole or in part, as described below with respect to FIG. 43.

Also shown in FIG. 40 are users 4032 and 4052. One or both of the users 4032 and 4052 may be a human user (e.g., a human being), a machine user (e.g., a computer configured by a software program to interact with the device 4030 or 4050), or any suitable combination thereof (e.g., a human assisted by a machine or a machine supervised by a human). The user 4032 is associated with the device 4030 and may be a user of the device 4030. For example, the device 4030 may be a desktop computer, a vehicle computer, a tablet computer, a navigational device, a portable media device, a smart phone, or a wearable device (e.g., a smart watch, smart glasses, smart clothing, or smart jewelry) belonging to the user 4032. Likewise, the user 4052 is associated with the device 4050 and may be a user of the device 4050. As an example, the device 4050 may be a desktop computer, a vehicle computer, a tablet computer, a navigational device, a portable media device, a smart phone, or a wearable device (e.g., a smart watch, smart glasses, smart clothing, or smart jewelry) belonging to the user 4052.

Any of the systems or machines (e.g., databases and devices) shown in FIG. 40 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 43, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 40 may be combined into a single system or machine, and the functions described herein for any single system or machine may be subdivided among multiple systems or machines.

The network 4090 may be any network that enables communication between or among systems, machines, databases, and devices (e.g., between the machine 4010 and the device 4030). Accordingly, the network 4090 may be a wired network, a wireless network (e.g., a mobile or cellular network), or any suitable combination thereof. The network 4090 may include one or more portions that constitute a private network, a public network (e.g., the Internet), or any suitable combination thereof. Accordingly, the network 4090 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 4090 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 41:
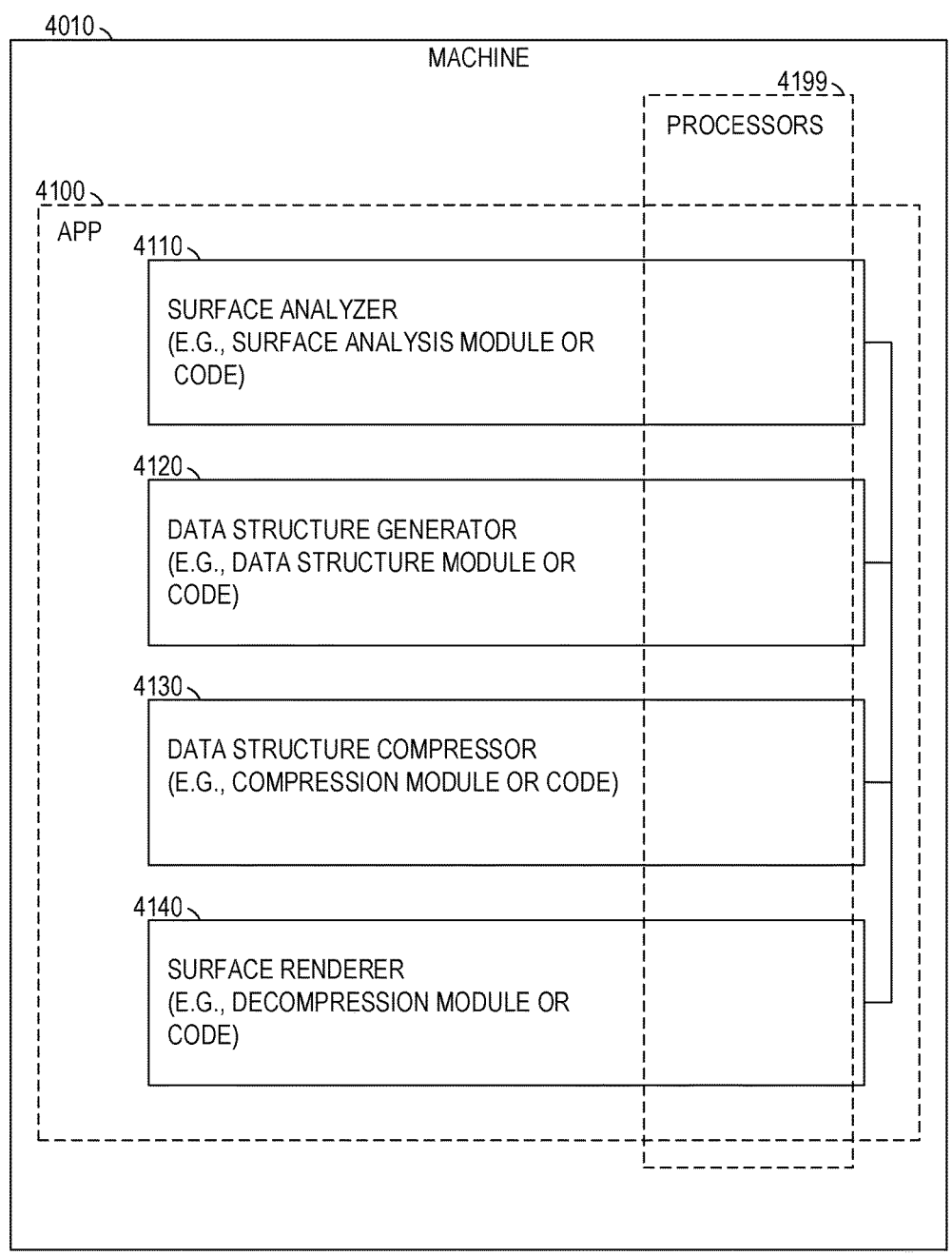
FIG. 41 is a block diagram illustrating components of a machine, according to some example embodiments.

FIG. 41 is a block diagram illustrating components of the machine 4010, according to some example embodiments. The machine 4010 is shown as including a surface analyzer 4110, a data structure generator 4120, a data structure compressor 4130, and a surface renderer 4140, all configured to communicate with each other (e.g., via a bus, shared memory, or a switch).

As shown in FIG. 41, the surface analyzer 4110, the data structure generator 4120, the data structure compressor 4130, the surface renderer 4140, or any suitable combination thereof, may form all or part of an app 4100 (e.g., a server application, a client application, or a mobile app) that is stored (e.g., installed) on the machine 4010 (e.g., responsive to or otherwise as a result of data being received via the network 4090). In certain example embodiments, the data structure compressor 4130 (e.g., an encoder) may additionally be or include a data structure decompressor (e.g., decoder). For example, the data structure compressor 4130 may be or include a hybrid compression-decompression (e.g., codec) engine. Furthermore, one or more processors 4199 (e.g., hardware processors, digital processors, or any suitable combination thereof) may be included (e.g., temporarily or permanently) in the app 4100, the surface analyzer 4110, the data structure generator 4120, the data structure compressor 4130, the surface renderer 4140, or any suitable combination thereof.

Any one or more of the components (e.g., modules) described herein may be implemented using hardware alone (e.g., one or more of the processors 4199) or a combination of hardware and software. For example, any component described herein may physically include an arrangement of one or more of the processors 4199 (e.g., a subset of or among the processors 4199) configured to perform the operations described herein for that component. As another example, any component described herein may include software, hardware, or both, that configure an arrangement of one or more of the processors 4199 to perform the operations described herein for that component. Accordingly, different components described herein may include and configure different arrangements of the processors 4199 at different points in time or a single arrangement of the processors 4199 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 42:
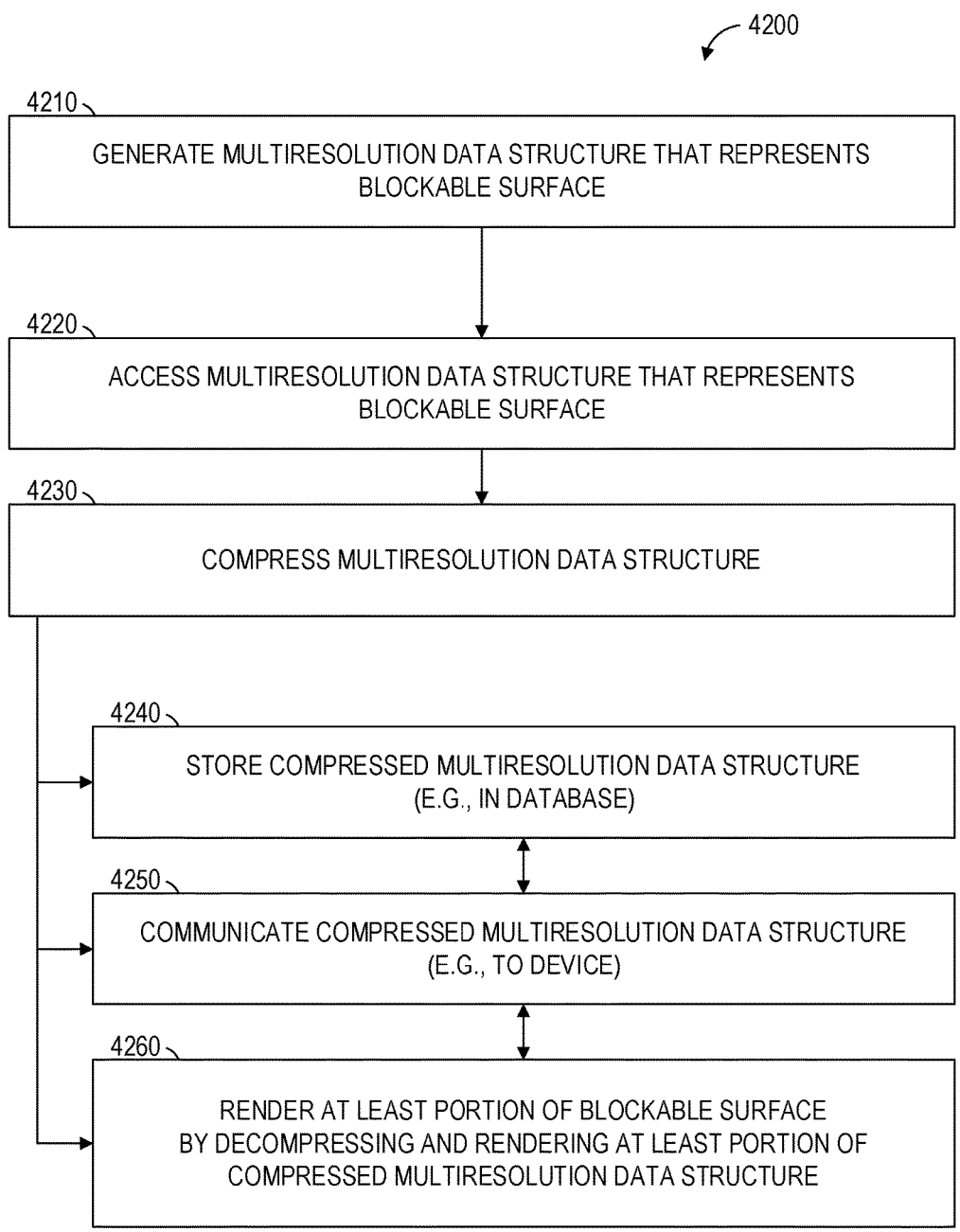
FIG. 42 is a flowchart illustrating operations in performing a method of processing any one or more of the data structures described herein, according to some example embodiments.

FIG. 42 is a flowchart illustrating operations in performing a method 4200 of processing (e.g., generating, compressing, storing, communicating, decompressing, or rendering) any one or more of the data structures described herein, according to some example embodiments. Operations in the method 4200 may be performed by the machine 4010, the device 4030, or any suitable combination thereof, using components (e.g., modules) described above with respect to FIG. 41, using one or more processors (e.g., microprocessors or other hardware processors), or using any suitable combination thereof. As shown in FIG. 42, the method 4200 includes one or more of operations 4210, 4220, 4230, 4240, 4250, and 4260.

In operation 4210, the data structure generator 4120 generates an instance of one of the data structures described herein. For example, this may be performed by generating a multiresolution data structure that represents a blockable surface. In some example embodiments, performance of operation 4210 includes causing the surface analyzer 4110 to analyze the blockable surface (e.g., based on information that provides an explicit definition, information that provides an implicit definition, or any suitable combination thereof) and obtain inputs for the generation of the multiresolution data structure.

In operation 4220, the data structure compressor 4130 accesses the data structure generated in operation 4210. For example, the data structure compressor 4130 may access a multiresolution data structure from the database 4015, the machine 4010, the device 4030, or any suitable combination thereof.

In operation 4230, the data structure compressor 4130 compresses the data structure accessed in operation 4220. For example, the data structure compressor 4130 may compress the accessed multiresolution data structure that represents the blockable surface.

One or more of operations 4240, 4250, and 4260 may be performed after operation 4230. In operation 4240, the data structure compressor 4130 stores the compressed data structure (e.g., the compressed multiresolution data structure) in a database (e.g., database 4015).

In operation 4250, the data structure compressor 4130 communicates the compressed data structure (e.g., the compressed multiresolution data structure) to a device (e.g., device 4030) via the network 4090 (e.g., for rendering or other processing thereon).

In operation 4260, the surface renderer 4140 renders at least a portion of the blockable surface. This may be performed by decompressing at least a portion of the compressed data structure (e.g., the compressed multiresolution data structure) and rendering the decompressed portion. In some example embodiments, the surface renderer 4140 performs the decompression of at least a portion of the compressed data structure and causes (e.g., commands or requests) a device (e.g., device 4030) to render at least the decompressed portion. In this context, the rendering of at least the decompressed portion can include generating one or more displayable images based on the decompressed portion, causing the displayable images to be displayed (e.g., on one or more display screens), or any suitable combination thereof.

Figure 43:
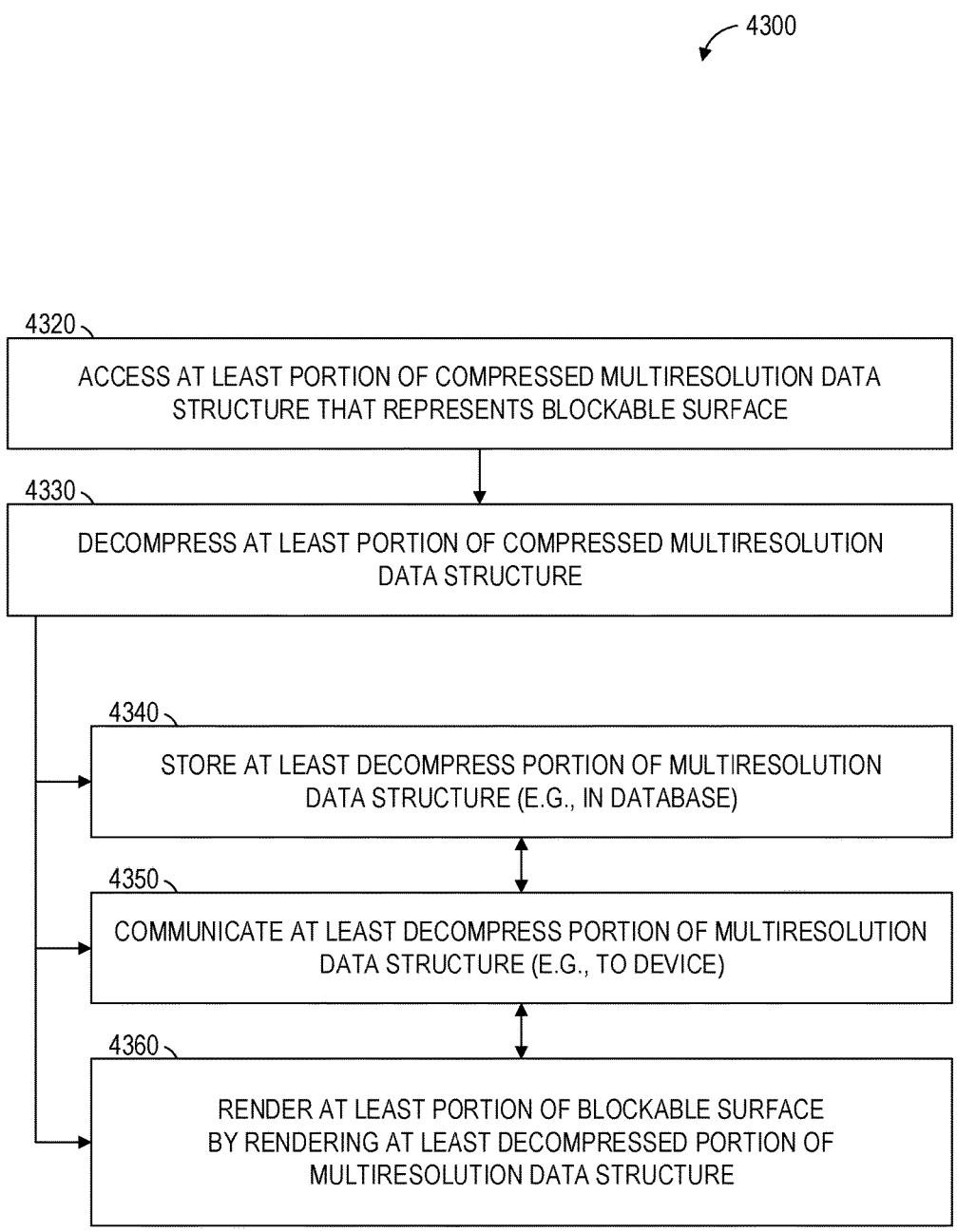
FIG. 43 is a flowchart illustrating operations in performing another method of processing any one or more of the data structures described herein, according to certain example embodiments.

FIG. 43 is a flowchart illustrating operations in performing another method of processing (e.g., accessing, storing, communicating, decompressing, or rendering) any one or more of the data structures described herein, according to certain example embodiments. Operations in the method 4300 may be performed by the machine 4010, the device 4030, or any suitable combination thereof, using components (e.g., modules) described above with respect to FIG. 41, using one or more processors (e.g., microprocessors or other hardware processors), or using any suitable combination thereof. As shown in FIG. 43, the method 4300 includes one or more of operations 4320, 4330, 4340, 4350, and 4360.

In operation 4320, the data structure compressor 4130 (e.g., with decompressor capabilities) accesses a data structure described herein (e.g., the data structure generated in operation 4210 of method 4200). For example, the data structure compressor 4130 may access a multiresolution data structure from the database 4015, the machine 4010, the device 4030, or any suitable combination thereof.

In operation 4330, the data structure compressor 4130 (e.g., with decompressor capabilities) decompresses at least a portion of the data structure accessed in operation 4320. For example, the data structure compressor 4130 may compress a portion of the accessed multiresolution data structure that represents the blockable surface.

One or more of operations 4340, 4350, and 4360 may be performed after operation 4330. In operation 4340, the data structure compressor 4130 stores at least the decompressed portion of the data structure (e.g., at least the decompressed portion of fully or partially the multiresolution data structure) in a database (e.g., database 4015).

In operation 4350, the data structure compressor 4130 communicates at least the decompressed portion of the data structure (e.g., at least the decompressed portion of the fully or partially decompressed multiresolution data structure) to a device (e.g., device 4030) via the network 4090 (e.g., for rendering or other processing thereon).

In operation 4360, the surface renderer 4140 renders at least a portion of the blockable surface. This may be performed by rendering at least the decompressed portion of the data structure (e.g., at least the decompressed portion of the fully or partially decompressed multiresolution data structure). In some example embodiments, the surface renderer 4140 causes (e.g., commands or requests) a device (e.g., device 4030) to render at least the decompressed portion. In this context, the rendering of at least the decompressed portion can include generating one or more displayable images based on the decompressed portion, causing the displayable images to be displayed (e.g., on one or more display screens), or any suitable combination thereof.

According to various example embodiments, one or more of the methodologies described herein may facilitate generating, compressing, storing, communicating, decompressing, rendering, all or part of any one or more of the blockable surface representations discussed herein. Moreover, one or more of the methodologies described herein may provide greater degrees of data compression, faster compression of all or part of a blockable surface representation, faster decompression of all or part of a compressed representation of a blockable surface, reductions in corresponding storage requirements, reductions in corresponding network traffic, enhanced communication of visual information, and enhanced presentation of visual information. Hence, one or more of the methodologies described herein may facilitate improved user experiences in perceiving visual information, including increased visual complexity, system performance, and system robustness, compared to capabilities of pre-existing systems and methods.

When these effects are considered in aggregate, one or more of the methodologies described herein may obviate a need for certain efforts or resources that otherwise would be involved in generating, compressing, storing, communicating, decompressing, rendering, all or part of a representation of a blockable surface. Efforts expended by a user in performing any one or more of these tasks may be reduced by use of (e.g., reliance upon) a special-purpose machine that implements one or more of the methodologies described herein. Computing resources used by one or more systems or machines (e.g., within the network environment 4000) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 44:
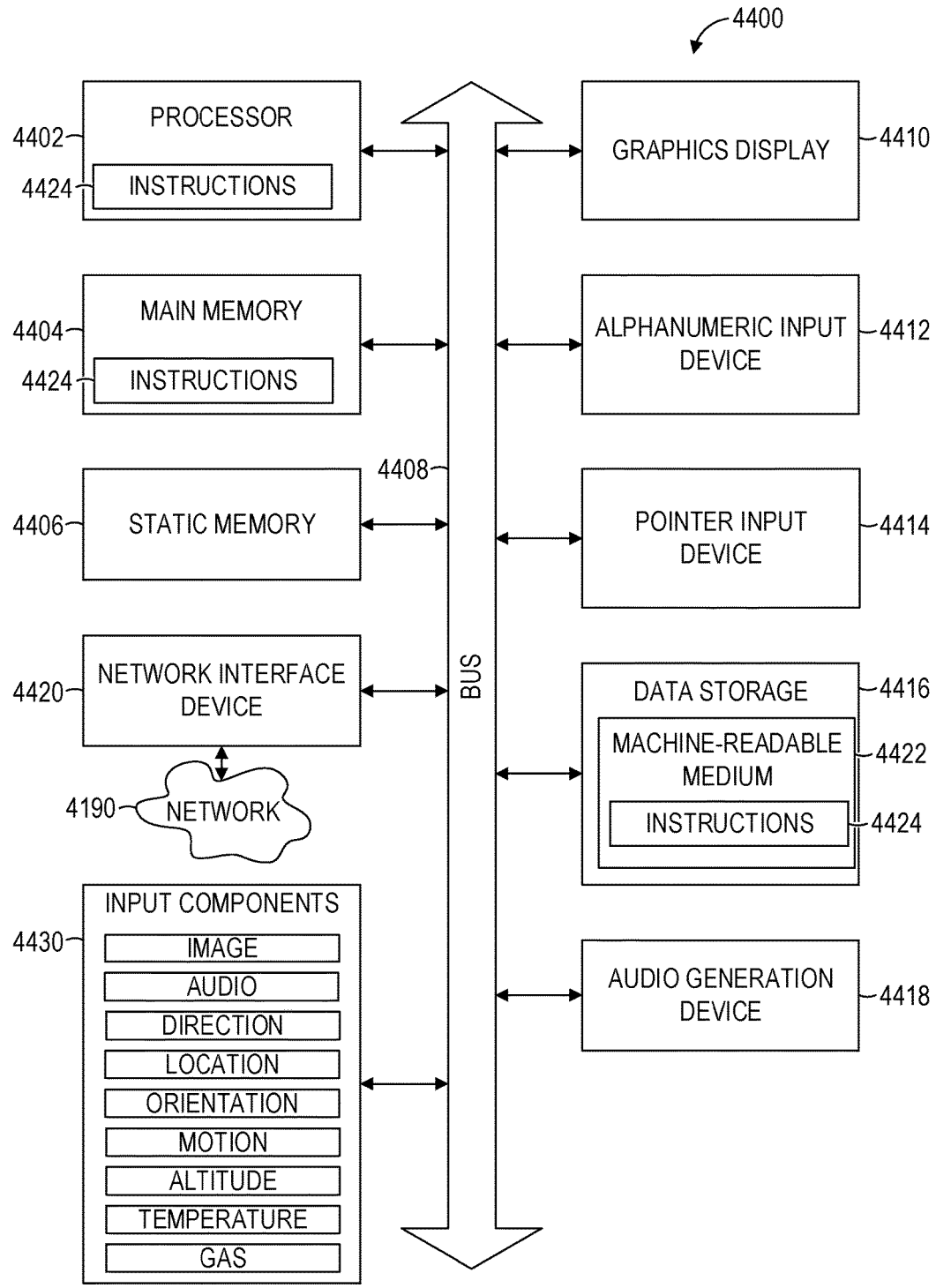
FIG. 44 is a block diagram illustrating components of a machine, according to some example embodiments, able to read instructions from a machine-readable medium and perform any one or more of the methodologies discussed herein.

FIG. 44 is a block diagram illustrating components of a machine 4400, according to some example embodiments, able to read instructions 4424 from a machine-readable medium 4422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 44 shows the machine 4400 in the example form of a computer system (e.g., a computer) within which the instructions 4424 (e.g., software, a program, an application, an applet, an app, or other executable code) for causing the machine 4424 to perform any one or more of the methodologies discussed herein may be executed, in whole or in part.

In alternative embodiments, the machine 4400 operates as a standalone device or may be communicatively coupled (e.g., networked) to other machines. In a networked deployment, the machine 4400 may operate in the capacity of a server machine or a client machine in a server-client network environment, or as a peer machine in a distributed (e.g., peer-to-peer) network environment. The machine 4400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 4424, sequentially or otherwise, that specify actions to be taken by that machine. Further, while only a single machine is illustrated, the term "machine" shall also be taken to include any collection of machines that individually or jointly execute the instructions 4424 to perform all or part of any one or more of the methodologies discussed herein.

The machine 4400 includes a processor 4402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 4304, and a static memory 4406, which are configured to communicate with each other via a bus 4408. The processor 4402 contains solid-state digital microcircuits (e.g., electronic, optical, or both) that are configurable, temporarily or permanently, by some or all of the instructions 4424 such that the processor 4402 is configurable to perform any one or more of the methodologies described herein, in whole or in part. For example, a set of one or more microcircuits of the processor 4402 may be configurable to execute one or more modules (e.g., software modules) described herein. In some example embodiments, the processor 4402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 4400 with at least the processor 4402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 4400 may further include a graphics display 4410 (e.g., a plasma display panel (PDP), a light emitting diode (LED) display, a liquid crystal display (LCD), a projector, a cathode ray tube (CRT), or any other display capable of displaying graphics or video). The machine 4400 may also include an alphanumeric input device 4312 (e.g., a keyboard or keypad), a pointer input device 4414 (e.g., a mouse, a touchpad, a touchscreen, a trackball, a joystick, a stylus, a motion sensor, an eye tracking device, a data glove, or other pointing instrument), a data storage 4416, an audio generation device 4418 (e.g., a sound card, an amplifier, a speaker, a headphone jack, or any suitable combination thereof), and a network interface device 4420.

The data storage 4416 (e.g., a data storage device) includes the machine-readable medium 4422 (e.g., a tangible and non-transitory machine-readable storage medium) on which are stored the instructions 4424 embodying any one or more of the methodologies or functions described herein. The instructions 4424 may also reside, completely or at least partially, within the main memory 4404, within the static memory 4406, within the processor 4402 (e.g., within the processor's cache memory), or any suitable combination thereof, before or during execution thereof by the machine 4400. Accordingly, the main memory 4404, the static memory 4406, and the processor 4402 may be considered machine-readable media (e.g., tangible and non-transitory machine-readable media). The instructions 4424 may be transmitted or received over the network 4090 via the network interface device 4420. For example, the network interface device 4420 may communicate the instructions 4424 using any one or more transfer protocols (e.g., hypertext transfer protocol (HTTP)).

In some example embodiments, the machine 4400 may be a portable computing device (e.g., a smart phone, a tablet computer, or a wearable device), and may have one or more additional input components 4430 (e.g., sensors or gauges). Examples of such input components 4430 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 4422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 4424 for execution by the machine 4400, such that the instructions 4424, when executed by one or more processors of the machine 4400 (e.g., processor 4402), cause the machine 4400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 4424 for execution by the machine 4400 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 4424).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors of a machine, a multiresolution data structure that represents a blockable surface;
compressing, by one or more processors of the machine, the accessed multiresolution data structure that represents the blockable surface; and
performing, by one or more processors of the machine, an operation selected from a group consisting of:
storing the compressed multiresolution data structure in a database, communicating the compressed multiresolution data structure to a device, and
rendering at least a portion of the blockable surface by decompressing at least a portion of the compressed multiresolution data structure and rendering the decompressed portion of the compressed multiresolution data structure.

A second embodiment provides a method according to the first embodiment, wherein:
the multiresolution data structure represents a plurality of blocks occupied by the blockable surface, at least some blocks in the plurality each explicitly defining a corresponding portion of the blockable surface.

A third embodiment provides a method according to the second embodiment, wherein:
a first block among the plurality of blocks explicitly defines a non-planar polygon whose vertices are located on selected edges of the first block.

A fourth embodiment provides a method according to the second embodiment or the third embodiment, wherein:
a first block among the plurality of blocks explicitly defines a non-planar polygon that includes a set of planar triangles.

A fifth embodiment provides a method according to any of the first through fourth embodiments, wherein:
the multiresolution data structure represents a plurality of blocks occupied by the blockable surface, at least some blocks in the plurality each implicitly defining a corresponding portion of the blockable surface.

A sixth embodiment provides a method according to the fifth embodiment, wherein:
a first block among the plurality of blocks implicitly defines a corresponding first portion of the blockable surface by specifying a level set of a first function determined by parameters corresponding to corners of the first block.

A seventh embodiment provides a method according to the sixth embodiment, wherein:
the determined first function is a determined tri-linear function that interpolates values at the corners of the first block.

An eighth embodiment provides a method according to the seventh embodiment, wherein:
the values at the corners of the first block include samples of a second function that represents a signed distance function.

A ninth embodiment provides a method according to the seventh embodiment, wherein:
the values at the corners of the first block include samples of a second function that represents an occupancy probability.

A tenth embodiment provides a method according to any of the first through ninth embodiments, wherein:
the multiresolution data structure represents a plurality of blocks occupied by the blockable surface, at least some blocks in the plurality each indicating a corresponding trajectory of motion of a corresponding portion of the blockable surface.

An eleventh embodiment provides a method according to the tenth embodiment, wherein:

a first block among the plurality of blocks indicates a corresponding set of trajectories that correspond to a set of vertices of a non-planar polygon defined by the first block.

A twelfth embodiment provides a method according to the tenth embodiment or the eleventh embodiment, wherein:
a first block among the plurality of blocks indicates a corresponding set of trajectories that correspond to a set of corners of the first block.

A thirteenth embodiment provides a method according to any of the first through twelfth embodiments, wherein:
the multiresolution data structure represents a plurality of blocks occupied by the blockable surface, a first block among the plurality of blocks explicitly defining a corresponding portion of the blockable surface; and
the compressing of the accessed multiresolution data structure that represents the blockable surface includes encoding the first block by indicating a set of edges of the first block and, for each edge, indicating a corresponding location along the edge.

A fourteenth embodiment provides a method according to any of the first through thirteenth embodiments, wherein:
the multiresolution data structure represents a plurality of blocks occupied by the blockable surface, a first block among the plurality of blocks implicitly defining a corresponding portion of the blockable surface; and
the compressing of the accessed multiresolution data structure that represents the blockable surface includes encoding the first block by encoding the values of a first function that corresponds to the first block.

A fifteenth embodiment provides a method according to the fourteenth embodiment, wherein:
the encoding of the values of the first function that corresponds to the first block is performed by a wavelet transform coder.

A sixteenth embodiment provides a method according to the fifteenth embodiment, wherein:
the wavelet transform coder includes a B-spline wavelet transform coder.

A seventeenth embodiment provides a method according to the fifteenth embodiment or the sixteenth embodiment, wherein:
the multiresolution data structure is an octree that indicates acceptability of non-zero wavelet coefficients.

An eighteenth embodiment provides a method according to the seventeenth embodiment, wherein:
the compressing of the accessed multiresolution data structure that represents the blockable surface includes pruning the octree by pruning subtrees whose wavelet coefficients fail to transgress a predetermined threshold value.

A nineteenth embodiment provides a method according to the seventeenth embodiment or the eighteenth embodiment, wherein:
the compressing of the accessed multiresolution data structure that represents the blockable surface includes pruning the octree based on a rate-distortion criterion.

A twentieth embodiment provides a machine-readable medium (e.g., a non-transitory machine-readable storage medium) comprising instructions that, when executed by one or more processors of a machine, cause the machine to perform operations comprising:
accessing a multiresolution data structure that represents a blockable surface;
compressing the accessed multiresolution data structure that represents the blockable surface; and
performing an operation selected from a group consisting of:
storing the compressed multiresolution data structure in a database,
communicating the compressed multiresolution data structure to a device, and rendering at least a portion of the blockable surface by decompressing at least a portion of the compressed multiresolution data structure and rendering the decompressed portion of the compressed multiresolution data structure.

A twenty-first embodiment provides a system (e.g., a computer system) comprising:
one or more processors; and
a memory storing instructions that, when executed by at least one processor among the one or more processors, cause the system to perform operations comprising:
accessing a multiresolution data structure that represents a blockable surface;
compressing the accessed multiresolution data structure that represents the blockable surface; and
performing an operation selected from a group consisting of:
storing the compressed multiresolution data structure in a database,
communicating the compressed multiresolution data structure to a device, and
rendering at least a portion of the blockable surface by decompressing at least a portion of the compressed multiresolution data structure and rendering the decompressed portion of the compressed multiresolution data structure.

A twenty-second embodiment provides a method comprising:
accessing, by one or more processors of a machine, at least a portion of a compressed multiresolution data structure that represents a blockable surface;
decompressing, by one or more processors of the machine, at least the accessed portion of the compressed multiresolution data structure that represents the blockable surface; and
performing, one or more processors of the machine, an operation selected from a group consisting of:
storing at least the decompressed portion of the multiresolution data structure in a database,
communicating at least the decompressed portion of the multiresolution data structure to a device, and
rendering at least a portion of the blockable surface by rendering at least the decompressed portion of the multiresolution data structure.

A twenty-third embodiment provides a method comprising:
accessing, by one or more processors of a machine, a compressed version of a multiresolution data structure that represents the blockable surface; and
providing, by one or more processors of the machine, at least a portion of the compressed multiresolution data structure that represents the blockable surface.

A twenty-fourth embodiment provides a carrier medium carrying machine-readable instructions for controlling a machine to carry out the method of any one of the previously described embodiments.

What is claimed is:

1. A method comprising:
accessing, by one or more processors of a machine, a multiresolution data structure that represents a blockable surface that intersects a plurality of blocks among which each block intersects a corresponding portion of the blockable surface, the multiresolution data structure representing each portion of the blockable surface by specifying a corresponding set of scalar values for that portion of the blockable surface, each set of scalar values defining the corresponding intersected portion of the blockable surface by specifying boundary conditions present on at least one edge of the corresponding block that intersects the corresponding portion of the blockable surface;
compressing, by one or more processors of the machine, the accessed multiresolution data structure that represents the blockable surface by, for each portion of the blockable surface represented, quantizing the corresponding set of scalar values for that portion of the blockable surface, the quantizing of each set of scalar values quantizing the specified boundary conditions present on at least one edge of the corresponding block that intersects the corresponding portion of the blockable surface; and
performing, by one or more processors of the machine, an operation selected from a group consisting of:
storing the compressed multiresolution data structure in a database,
communicating the compressed multiresolution data structure to a device, and
rendering at least a portion of the blockable surface by decompressing at least a portion of the compressed multiresolution data structure and rendering the decompressed portion of the compressed multiresolution data structure.

2. The method of claim 1, wherein:
the multiresolution data structure represents the plurality of blocks occupied by the blockable surface, at least some blocks in the plurality each explicitly defining a corresponding portion of the blockable surface.

3. The method of claim 2, wherein:
a first block among the plurality of blocks explicitly defines a non-planar polygon whose vertices are located on selected edges of the first block.

4. The method of claim 2, wherein:
a first block among the plurality of blocks explicitly defines a non-planar polygon that includes a set of planar triangles.

5. The method of claim 1, wherein:
the multiresolution data structure represents the plurality of blocks occupied by the blockable surface, at least some blocks in the plurality each implicitly defining a corresponding portion of the blockable surface.

6. The method of claim 5, wherein:
a first block among the plurality of blocks implicitly defines a corresponding first portion of the blockable surface by specifying a level set of a first function determined by parameters corresponding to corners of the first block.

7. The method of claim 6, wherein:
the determined first function is a determined tri-linear function that interpolates values at the corners of the first block.

8. The method of claim 7, wherein:
the values at the corners of the first block include samples of a second function that represents a signed distance function.

9. The method of claim 7, wherein:
the values at the corners of the first block include samples of a second function that represents an occupancy probability.

10. The method of claim 1, wherein:
the multiresolution data structure represents the plurality of blocks occupied by the blockable surface, at least some blocks in the plurality each indicating a corresponding trajectory of motion of a corresponding portion of the blockable surface.

11. The method of claim 10, wherein:
a first block among the plurality of blocks indicates a corresponding set of trajectories that correspond to a set of vertices of a non-planar polygon defined by the first block.

12. The method of claim 10, wherein:
a first block among the plurality of blocks indicates a corresponding set of trajectories that correspond to a set of corners of the first block.

13. The method of claim 1, wherein:
the multiresolution data structure represents the plurality of blocks occupied by the blockable surface, a first block among the plurality of blocks explicitly defining a corresponding portion of the blockable surface; and
the compressing of the accessed multiresolution data structure that represents the blockable surface includes encoding the first block by indicating a set of edges of the first block and, for each edge, indicating a corresponding location along the edge.

14. The method of claim 1, wherein:
the multiresolution data structure represents the plurality of blocks occupied by the blockable surface, a first block among the plurality of blocks implicitly defining a corresponding portion of the blockable surface; and
the compressing of the accessed multiresolution data structure that represents the blockable surface includes encoding the first block by encoding the values of a first function that corresponds to the first block.

15. The method of claim 14, wherein:
the encoding of the values of the first function that corresponds to the first block is performed by a wavelet transform coder.

16. The method of claim 15, wherein:
the wavelet transform coder includes a B-spline wavelet transform coder.

17. The method of claim 15, wherein:
the multiresolution data structure is an octree that indicates acceptability of non-zero wavelet coefficients.

18. The method of claim 17, wherein:
the compressing of the accessed multiresolution data structure that represents the blockable surface includes pruning the octree by pruning subtrees whose wavelet coefficients fail to transgress a predetermined threshold value.

19. The method of claim 17, wherein:
the compressing of the accessed multiresolution data structure that represents the blockable surface includes pruning the octree based on a rate-distortion criterion.

20. A non-transitory machine-readable storage medium comprising instructions that, when executed by one or more processors of a machine, cause the machine to perform operations comprising:
accessing a multiresolution data structure that represents a blockable surface that intersects a plurality of blocks among which each block intersects a corresponding portion of the blockable surface, the multiresolution data structure representing each portion of the blockable surface by specifying a corresponding set of scalar values for that portion of the blockable surface, each set of scalar values defining the corresponding intersected portion of the blockable surface by specifying boundary conditions present on at least one edge of the corresponding block that intersects the corresponding portion of the blockable surface;
compressing the accessed multiresolution data structure that represents the blockable surface by, for each portion of the blockable surface, quantizing the corresponding set of scalar values for that portion of the blockable surface, the quantizing of each set of scalar values quantizing the specified boundary conditions present on at least one edge of the corresponding block that intersects the corresponding portion of the blockable surface; and
performing an operation selected from a group consisting of:
storing the compressed multiresolution data structure in a database,
communicating the compressed multiresolution data structure to a device, and
rendering at least a portion of the blockable surface by decompressing at least a portion of the compressed multiresolution data structure and rendering the decompressed portion of the compressed multiresolution data structure.

21. A system comprising:
one or more processors;
a memory storing instructions that, when executed by at least one processor among the one or more processors, cause the system to perform operations comprising:
accessing a multiresolution data structure that represents a blockable surface that intersects a plurality of blocks among which each block intersects a corresponding portion of the blockable surface, the multiresolution data structure representing each portion of the blockable surface by specifying a corresponding set of scalar values for that portion of the blockable surface, each set of scalar values defining the corresponding intersected portion of the blockable surface by specifying boundary conditions present on at least one edge of the corresponding block that intersects the corresponding portion of the blockable surface;
compressing the accessed multiresolution data structure that represents the blockable surface by, for each portion of the blockable surface represented, quantizing the corresponding set of scalar values for that portion of the blockable surface, the quantizing of each set of scalar values quantizing the specified boundary conditions present on at least one edge of the corresponding block that intersects the corresponding portion of the blockable surface; and
performing an operation selected from a group consisting of:
storing the compressed multiresolution data structure in a database,
communicating the compressed multiresolution data structure to a device, and
rendering at least a portion of the blockable surface by decompressing at least a portion of the compressed multiresolution data structure and rendering the decompressed portion of the compressed multiresolution data structure.

* * * * *

UNITED STATES PATENT AND TRADEMARK OFFICE
CERTIFICATE OF CORRECTION

PATENT NO. : 10,192,353 B1
APPLICATION NO. : 15/786277
DATED : January 29, 2019
INVENTOR(S) : Chou et al.

Page 1 of 2

It is certified that error appears in the above-identified patent and that said Letters Patent is hereby corrected as shown below:

On the Title Page

In item (72), in "Inventors", in Column 1, Line 2, delete "Wllington" and insert --Wellington-- therefor On page 2, in Column 1, under "Other Publications", Line 5, delete "probablilities"," and insert --probabilities",-- therefor On page 2, in Column 1, under "Other Publications", Line 12, delete "Ef?ciency" and insert --Efficiency-- therefor In the Specification In Column 7, Line 26, delete "$\theta_i$=a tan 2($a_i,b_i$)." and insert --$\theta_i$=atan2($a_i,b_i$).-- therefor In Column 8, Line 42, delete "1300" and insert --1310-- therefor In Column 10, Line 11, delete "n–$\mathbb{Z}^3$," and insert --n $\in \mathbb{Z}^3$,-- therefor In Column 11, Line 15, delete "$V_l \subseteq V_{l+1}$." and insert --$V_\ell \subseteq V_{\ell+1}$.-- therefor In Column 11, Line 21, delete "$f_l(x) = \Sigma_{n \in \mathbb{Z}^3} F_{l,n} B^{(2)}(2^l x - n)$," and insert --$f_\ell(x) = \sum_{n \in \mathbb{Z}^3} F_{\ell,n} B^{(2)}(2^\ell x - n)$,-- therefor In Column 11, Line 30, delete "$g_l, g_l'$, $\in W_l$," and insert --$g_\ell, g'_\ell, \in W_\ell$,-- therefor Signed and Sealed this
Twenty-fifth Day of June, 2019

Andrei Iancu
*Director of the United States Patent and Trademark Office*

In Column 18, Line 31, delete "4424" and insert --4400-- therefor

In Column 18, Line 59, delete "4304," and insert --4404,-- therefor

In Column 19, Line 21, delete "4312" and insert --4412-- therefor